United States Patent [19]

Komatsu et al.

[11] Patent Number: 5,573,895
[45] Date of Patent: Nov. 12, 1996

[54] RECYCLING METHOD FOR PHOTOGRAPHIC PROCESSING WASTE LIQUID

[75] Inventors: Yoshimasa Komatsu; Masao Ishikawa; Moeko Hagiwara; Kenji Ishida; Hiroshi Yoshimoto; Shinsaku Nagaoka, all of Hino, Japan

[73] Assignee: Konica Corporation, Tokyo, Japan

[21] Appl. No.: 473,125

[22] Filed: Jun. 7, 1995

Related U.S. Application Data

[63] Continuation of Ser. No. 77,286, Jun. 14, 1993, abandoned.

[30]    Foreign Application Priority Data

| Jun. 12, 1992 | [JP] | Japan | 4-153788 |
| Jun. 15, 1992 | [JP] | Japan | 4-155131 |
| Jun. 15, 1992 | [JP] | Japan | 4-155132 |
| Jun. 15, 1992 | [JP] | Japan | 4-180304 |
| Jun. 18, 1992 | [JP] | Japan | 4-159577 |
| Jun. 19, 1992 | [JP] | Japan | 4-161335 |
| Jun. 19, 1992 | [JP] | Japan | 6-161338 |
| Jun. 29, 1992 | [JP] | Japan | 4-171245 |

[51] Int. Cl.$^6$ .............. G03C 3/00; G03C 5/18; G03C 5/26; G03C 5/38
[52] U.S. Cl. .......... 430/398; 430/399; 430/400; 430/451; 430/485; 159/17.3; 159/DIG. 16; 202/205; 203/91
[58] Field of Search .............. 430/398, 399, 430/400, 451, 485; 159/47.3, DIG. 16; 202/205; 203/91

[56]    References Cited

U.S. PATENT DOCUMENTS

| 3,337,342 | 8/1967 | Green | 430/485 |
| 4,234,392 | 11/1980 | Tada et al. | 203/91 |
| 4,767,498 | 8/1988 | Kreisler | 159/47.3 |
| 4,876,174 | 10/1989 | Ishikawa et al. | 430/485 |
| 5,004,522 | 4/1991 | Koboshi et al. | 159/47.3 |
| 5,011,571 | 4/1991 | Kobayashi et al. | 159/DIG. 16 |
| 5,057,191 | 10/1991 | Kuromatsu et al. | 159/47.3 |
| 5,108,548 | 4/1992 | Keane et al. | 202/205 |
| 5,188,925 | 2/1993 | Hagiwara et al. | 430/372 |
| 5,211,816 | 5/1993 | Youngner | 202/205 |
| 5,248,394 | 9/1993 | Schlesinger et al. | 202/205 |
| 5,353,085 | 10/1994 | Kurematsu et al. | 354/324 |
| 5,439,560 | 8/1995 | Kuromatsu et al. | 159/DIG. 16 |
| 5,452,045 | 9/1995 | Koboshi et al. | 430/398 |
| 5,466,344 | 11/1995 | Lindke | 202/205 |

FOREIGN PATENT DOCUMENTS

| 0272883 | 6/1988 | European Pat. Off. . |
| 0428101 | 5/1991 | European Pat. Off. . |
| 0474461 | 11/1992 | European Pat. Off. . |
| 0530832 | 3/1993 | European Pat. Off. . |
| 2174251 | 10/1973 | France . |
| 0052627 | 4/1977 | Japan | 430/451 |
| 2277588 | 11/1990 | Japan . |
| 4027484 | 1/1992 | Japan . |

OTHER PUBLICATIONS

Patent Abstracts of Japan, vol. 10, No. 247 (P–490) (2303) 26 Aug. 1986.
Japanese Patent JP62–201442, Kuse et al., Sep. 1987, English abstract, JAPIO database.
Japanese Patent JP03–229688, Kurematsu et al., Oct. 1991, English abstract, JAPIO database.
JP-A-61 075 354 (Fuji) 17 Apr. 1986 *English abstract*.

*Primary Examiner*—Glenn A. Caldarola
*Assistant Examiner*—J. Pasterczyk
*Attorney, Agent, or Firm*—Frishauf, Holtz, Goodman, Langer & Chick, P.C.

[57]    ABSTRACT

A recycling method for photographic processing waste liquid is disclosed. The photographic processing waste liquid is subjected to evaporative concentration under a reduced pressure of not higher than 700 mmHg and at a temperature of not higher than 90° C. The resulting distillate is used as a solvent for photographic processing agents or as an evaporation compensator for processing tanks of an automatic processing machine.

18 Claims, 3 Drawing Sheets

RECYCLING METHOD FOR PHOTOGRAPHIC PROCESSING WASTE LIQUID

This application is a Continuation of application Ser. No. 08/077,286, filed Jun. 14, 1993, now abandoned.

FIELD OF THE INVENTION

The present invention relates to a method of efficiently utilizing the waste liquid resulting from processing of a photographic light-sensitive material using an automatic processing machine etc. (hereinafter simply referred to as photographic processing waste liquid or waste liquid).

BACKGROUND OF THE INVENTION

Generally, a silver halide photographic light-sensitive material is processed by developing, fixing, washing and other processes for black-and-white light-sensitive materials or color developing, bleach-fixing (or bleaching and fixing), washing, stabilizing and other processes for color light-sensitive materials. In photographic processes wherein a large amount of light-sensitive material is processed, it is a common practice to replenish the components consumed during the processing and remove the components dissolving from the light-sensitive material into the processing solution to keep constant the processing solution component balance and hence to maintain constant processing solution performance. Specifically, a replenisher is supplied to the processing solution and a part of the processing solution is discharged and disposed of as a waste liquid from the processing system to remove the dissolved components.

However, such photographic processing waste liquids exert very high pollution load on the environment.

As a solution to the problem of waste liquid of photographic treatment and water supply, Japanese Patent Publication Open to Public Inspection (hereinafter referred to as Japanese Patent O.P.I. Publication) No. 201442/1987 discloses a method wherein waste liquid is thermally evaporated under normal pressure and the resulting distillate is recycled, with a description that the distillate can be used as such to prepare a bleach-fixer. However, some secondary treatment is necessary before the thus-obtained distillate can be used as a solvent for color developer, stabilizer and other processing solutions. This method also proved undesirable from the viewpoint of work environmental hygiene because of malodor generation upon evaporative concentration.

Also, the same publication discloses that the distillate can be used as such to prepare a bleach-fixer. However, if the waste liquid is thermally evaporated under normal pressure, various waste liquid components and decomposition products accumulate in the distillate; the distillate cannot serve for practical use as a solvent or an evaporation compensator.

Also, Japanese Patent O.P.I. Publication No. 229688/1991 and other publications disclose a method of thermally evaporating photographic processing waste liquid by a pressure reducing means, which method certainly is almost free of malodor generation upon evaporative concentration, or considerably reduces the accumulation of waste liquid component decomposition products etc. in the distillate. However, when the distillate resulting from this method was used as a solvent or an evaporation compensator, there occurred image storage stability deterioration after processing, particularly yellow dye fading and increased yellow staining at high temperatures. Post-processing film staining and pre-drying squeeze roller staining were also demonstrated.

SUMMARY OF THE INVENTION

The object of the present invention is to provide a method of producing water which can be used as a solvent for processing agents and as an evaporation compensator without affecting photographic processing performance and reducing the amount of waste liquid to be treated without malodor generation.

The other object of the present invention is to provide a recycling method for photographic processing waste liquid wherein a photographic processing waste liquid is recycled to eliminate its discharge into the environment, to offer water for use as a solvent for processing agents and/or as an evaporation compensator without affecting photographic processing performance, especially without affecting an occurrence of stain or reduction of maximum density of the photographic image, and to prevent the waste liquid components from entering in the distillate during reduced pressure distillation of the photographic processing waste liquid.

In a recycling method for photographic processing waste liquid of the invention, a photographic processing waste liquid is subjected to evaporative concentration under a reduced pressure of not higher than 700 mmHg and at a temperature of not higher than 90° C. The resulting distillate is used as a solvent for photographic processing agents or as an evaporation compensator for processing tanks of an automatic processing machine.

In the recycling method mentioned above, the photographic processing waste liquid is subjected to evaporative concentration under a reduced pressure of, preferably, not higher than 200 mmHg.

In the recycling method, photographic processing waste liquid is subjected to evaporative concentration at a temperature of, preferably, not higher than 60° C. In the above, the photographic processing waste liquid has an ammonium ion concentration of, preferably, not higher than 2000 ppm.

By conducting evaporative concentration of waste liquid under reduced pressure and at a relatively low heating temperature of not higher than 90° C. the waste liquid can be treated without malodor generation upon evaporative concentration, and water can be obtained which can be used as a solvent for processing agents and/or as an evaporation compensator without affecting photographic processing performance.

DETAILED DESCRIPTION OF THE INVENTION

Any photographic processing waste liquid can be used for the present invention, irrespective of which photographic process it results from. Also, it may be a waste liquid resulting from a single photographic process or a combination of waste liquids resulting from a number of processes.

Figure 1:
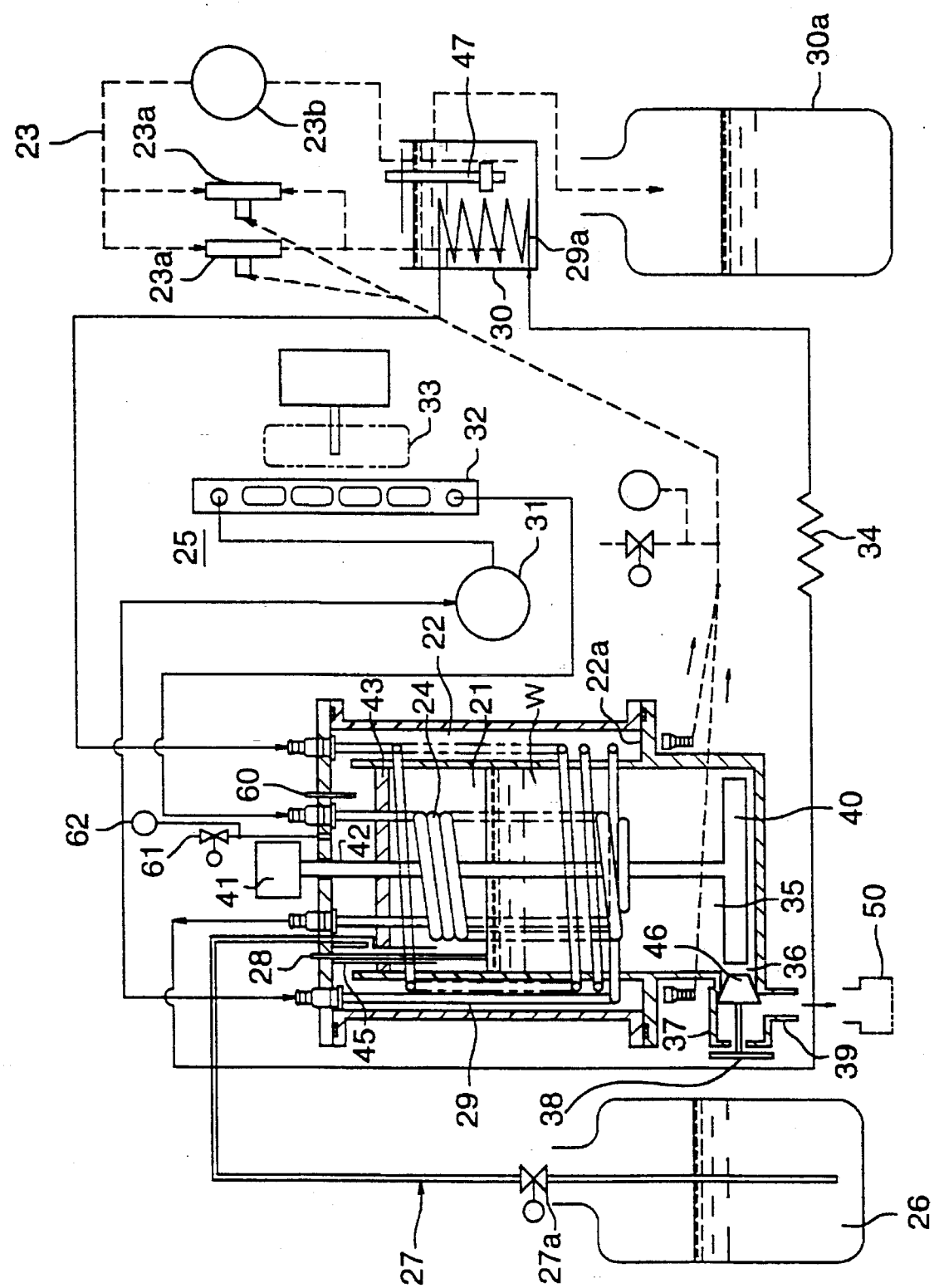
FIGS. 1 to 3 illustrate a schematic diagram of an example of a reduced pressure evaporative concentrator applicable to the present invention.

From the viewpoint of evaporation efficiency, reduced pressure for evaporative concentration of the waste liquid is preferably not higher than 200 mmHg, more preferably between 5 and 100 mmHg, still more preferably between 10 and 55 mmHg, and most preferably between 15 and 45 mmHg. Evaporating temperature should be not higher than 90° C. where waste liquid components undergo no decomposition or volatilization, preferably not higher than 70° C., more preferably between 10° and 60° C., and most preferably between 15° and 50° C. Although the evaporative concentrator may be of any configuration, as long as the above requirements are met, it is required to be of such configuration that the distillate is recovered by cooling the steam resulting from the evaporation treatment to recycle the evaporated water. An example evaporative concentrator for the present invention is illustrated in FIG. 1 of Japanese Patent Application No. 2813/1991.

In color photographic processing, the recovered distillate is used as a solvent and/or as an evaporation compensator for each of color developer, bleacher, fixer, bleach-fixer and stabilizer.

When the recovered distillate is used as a solvent and/or as an evaporation compensator for color developer, it is preferable to reduce the ammonium ion concentration of the waste liquid to be subjected to evaporative concentration below 2000 ppm, more preferably below 1000 ppm, since color developing requires much more precise control of processing solution composition than in other processes.

The distillation of the waste liquid is preferably conducted in the presence of a defoaming agent. The agent may be added into the waste liquid.

Evaporating temperature should be not higher than 90° C., where waste liquid components undergo no decomposition or volatilization, preferably not higher than 70° C. and most preferably between 10° and 60° C. This evaporative concentration is effected by bringing the photographic processing waste liquid into contact with the surface of a heater, but this method can result in gas generation, bubbling, etc. in the waste liquid. To minimize this bubbling, it is preferable to add a silicon or fluorine type defoaming agent, specifically one represented by the following formula 1 or 2:

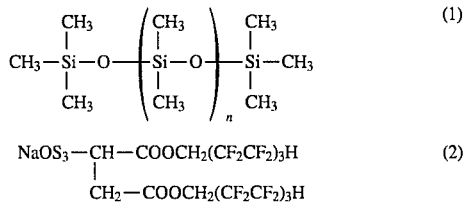

$$NaOS_3-CH-COOCH_2(CF_2CF_2)_3H \quad (2)$$
$$\phantom{NaOS_3-}|$$
$$\phantom{NaOS_3-}CH_2-COOCH_2(CF_2CF_2)_3H$$

The most preferable is a silicon type defoaming agent represented by formula 1.

The amount of defoaming agent added is preferably 0.001 to 10 g/liter, more preferably 0.01 to 2 g/liter. This type of defoaming agents are generally available from Dow Corning K. K., Shin-Etsu Silicone Co., Ltd., Toray Silicone Co., Ltd. and Nippon Unicar Co., Ltd.

The carbonate or bicarbonate content of the distillate is preferably not higher than 5 g/l.

The carbonate or bicarbonate content in the distillate can be reduced below 5 g/l by reducing the carbonate and bicarbonate content in the photographic processing waste liquid below 5 g/l and/or making the ammonium ion concentration in the photographic processing waste liquid substantially zero and/or reducing the pH of the photographic processing waste liquid below 6.50, whereby the above object is efficiently accomplished.

The carbonate and/or bicarbonate content in the distillate is not higher than 5 g/l, preferably not higher than 3 g/l, and more preferably not higher than 1 g/l. To achieve this mode of embodiment, the carbonate content in the above-described photographic processing waste liquid is preferably not higher than 5 g/l, more preferably not higher than 3 g/l, and still more preferably not higher than 1 g/l. In another mode of embodiment, it is also effective to make the ammonium ion concentration in the photographic processing waste liquid substantially zero. It was shown that in the absence of ammonium ions, the carbonate or bicarbonate ions in the photographic processing waste liquid do not migrate into the distillate. Another mode of embodiment proved effective in suppressing the migration of carbonate and bicarbonate into the distillate by adjusting the photographic processing waste liquid to appropriate pH. Accordingly, pH and the evaporation of carbonate and bicarbonate are closely related mutually; migration of carbonate and bicarbonate into the distillate can be almost perfectly suppressed by reducing waste liquid pH below 6.5, preferably below 5.50.

In ordinary photographic laboratories, a number of processing machines are often used, which differ in the type of light-sensitive material that they process, as well as in operating conditions such as replenishers, processing throughput and processing temperature. As a result, different waste liquids usually have different compositions.

In evaporative concentration of such waste liquids with different compositions, the resulting distillates have slight differences in composition; some distillate compositions can significantly affect photographic performance, including undesirable staining and reduction in maximum density.

This problem is associated with the use of a processing solution containing benzyl alcohol to process the light-sensitive material, and mixing of the resulting overflow in the waste liquid.

The waste liquid is preferably contains substantially no benzyl alcohol and is subjected to evaporative concentration under a reduced pressure of not higher than 700 mmHg and at a temperature of not higher than 90° C., the resulting distillate.

The photographic processing waste liquid may be a mixture of photographic processing waste liquids from two or more kinds of automatic processing machines.

In one of the embodiment of the present invention, it is preferable to substantially avoid use of benzyl alcohol, which is usually used as developing accelerator, in the waste liquid, i.e., to prevent the benzyl alcohol from migrating into the color developer. This practice offers good photographic performance without increase in staining or reduction in maximum density even when the waste liquid distillate is reused as a solvent and/or as an evaporation compensator.

Although the mechanism remains unclear, it is conjectured that the presence of benzyl alcohol in the color developer may result in increased dissolution and accumulation of components from the light-sensitive material during its continuous processing, which in turn aggravates staining and image storage stability deterioration.

In the present specification, to contain substantially no benzyl alcohol means that the benzyl alcohol content in the color developer is not higher than 5.0 ml/l, preferably not higher than 2.0 mg/l, and most preferably zero.

The effect of the present invention is enhanced when photographic processing waste liquids from two or more kinds of automatic processing machine are combinedly subjected to evaporative concentration and reused.

The photographic processing waste liquid preferably contains substantially no acetic acid, and the distillate resulting from the evaporative concentration of the photographic processing waste liquid is used as a solvent for processing agents and/or as an evaporation compensator for processing tanks of an automatic processing machine.

The photographic processing waste liquid preferably contains substantially no acetic acid. The presence of acetic acid in the photographic processing waste liquid results in accumulation of acetic acid components in the distillate during pressure reduction. Use of this distillate as a solvent results in sometimes deterioration of image storage stability after processing, particularly yellow staining and dark fading. To contain substantially no acetic acid means that the acetic acid content is not higher than 1.0 ml, preferably not higher than 0.5 ml, and most preferably zero per liter of waste liquid.

Acetic acid is used as a buffer in bleachers, bleach-fixers and other processing solutions for color photography. Acetic acid substitutes include aliphatic monobasic acids such as glycolic acid, propionic acid, lactic acid, acrylic acid, butyric acid and pivalic acid, amino acid type monobasic acids such as asparagine, alanine, arginine, ethionine, glycine, glutamine and methionine, aromatic monobasic acids such as benzoic acid and its derivatives and nicotinic acid, aliphatic dibasic acids such as oxalic acid, malonic acid, succinic acid, tartaric acid, malic acid, maleic acid, fumaric acid, glutaric acid and adipic acid, amino acid type dibasic acids such as aspartic acid, glutamic acid and ascorbic acid, and aromatic dibasic acids such as phthalic acid and terephthalic acid, with preference given to dibasic acids.

An acid other than acetic acid is preferably added to at least one of the photographic processing waste liquid tank, evaporative concentration chamber and distillate tank.

In this instance the ammonium ion concentration in the photographic processing waste liquid is, preferably, not higher than 2000 ppm.

Photographic processing waste liquids include color developers, bleachers, fixers, bleach-fixers, stabilizers and preliminary washing black-and-white developers in the case of ordinary color photographic processes, and those for X-ray photography, those for printing and those for PS plate making.

In the present invention, it is preferable to add acid other than acetic acid to at least one of the photographic processing waste liquid tank, evaporative concentration chamber and distillate tank. Investigations by the inventors revealed that the distillate resulting from evaporative concentration under reduced pressure of a photographic processing waste liquid contains various components that can affect photographic performance and the human body, particularly those that can affect post-processing image storage stability, though their contents are significantly lower than in the distillate resulting from simple distillation. Ammonium ions, carbonates, sulfites, etc. are likely to migrate into the distillate. Investigations of various methods of removing or inactivating these substances showed that image storage stability can be significantly improved by adding acid to at least one of the photographic processing waste liquid tank, evaporative concentration chamber and distillate tank.

The acid may be provided continuously at a constant rate according to the volume of the waste liquid or the volume of the distillate, or may be provided at a time at use or processing. Preferably, the acid is provided to reduce the pH of the waste liquid or distillate below 6.5, preferably below 6.3.

The acid is provided by means of a bellows pump jockey or another means, whether manually or automatically and whether in the form of solid or liquid.

Although the acid may be inorganic or organic, preference is given to inorganic acid.

Examples of inorganic acids include acids usually used, such as sulfuric acid, hydrochloric acid and nitric acid, and salts such as sodium hydrogen sulfate. Examples of organic acids include monobasic acids such as aliphatic monobasic acids, amino acid type monobasic acids and aromatic monobasic acids, and dibasic and higher basic acids such as p-toluenesulfonic acid. Essentially, any compound may be used, as long as it results in a pH of not higher than 6.5, preferably not higher than 6.3.

When the recovered distillate is used as a solvent and an evaporation compensator for a color developer, it is preferable to reduce the ammonium ion concentration of the waste liquid to be subjected to evaporative concentration below 2000 ppm, more preferably below 1000 ppm, since color developing requires much more precise control of processing solution composition than in other processes.

The presence of ammonium ions in other processing solutions results in an increase in carbonates and sulfites, probably attributable to the effect of the ammonium ions, which in turn adversely affects photographic performance.

The photographic processing waste liquid should contain substantially no acetic acid. The presence of acetic acid in the photographic processing waste liquid results in accumulation of acetic acid components in the distillate during pressure reduction. Use of this distillate as a solvent was also found to result in deterioration of image storage stability after processing, particularly yellow staining and dark fading. To contain substantially no acetic acid means that the acetic acid content is not higher than 1.0 ml, preferably not higher than 0.5 ml, and most preferably zero per liter of waste liquid.

Acetic acid is used as a buffer in bleachers, bleach-fixers and other processing solutions for color photography. Acetic acid is substituted with aliphatic monobasic acids such as glycolic acid, propionic acid, lactic acid, acrylic acid, butyric acid and pivalic acid, amino acid type monobasic acids such as asparagine, alanine, arginine, ethionine, glycine, glutamine and methionine, aromatic monobasic acids such as benzoic acid and its derivatives and nicotinic acid, aliphatic dibasic acids such as oxalic acid, malonic acid, succinic acid, tartaric acid, malic acid, maleic acid, fumaric acid, glutaric acid and adipic acid, amino acid type dibasic acids such as aspartic acid, glutamic acid and ascorbic acid, and aromatic dibasic acids such as phthalic acid and terephthalic acid, with preference given to dibasic acids.

The presence of formaldehyde in the photographic processing waste liquid sometimes results in a reduced photographic density and precipitation upon reuse of the distillate obtained by evaporative concentration under reduced pressure.

In the recycling method for photographic processing waste liquid, the photographic processing waste liquid, especially, a stabilizer waste liquid contains substantially no formaldehyde.

In this instance containment of at least one of compounds F-1 through F-13 in the stabilizer is preferable, since the effect of the present invention is further enhanced.

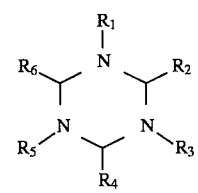

Formula F-1 wherein each of $R_1$ to $R_6$ is hydrogen atom or a monovalent organic group.

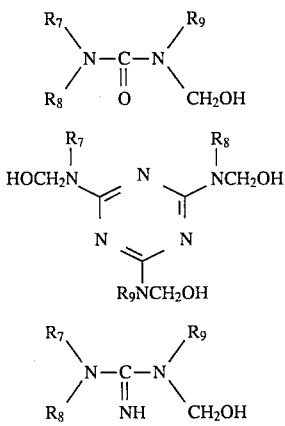

Formula F-2

Formula F-3

Formula F-4 wherein each of $R_7$ to $R_9$ is hydrogen atom or a methylol group.

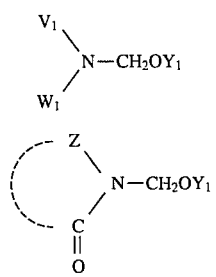

Formula F-5

Formula F-6 wherein $V_1$ and $W_1$ each represent an electron attractive group or $V_1$ and $W_1$ may form a 5 or 6 membered nitrogen containing heterocycle by bonding $V_1$ and $W_1$. $Y_1$ is a hydrogen atom or a group releasing upon hydrolysis. Z represents non-metal atomic group necessary to form a single- or condensed-nitrogen containing heterocycle with a nitrogen atom and =C=O group.

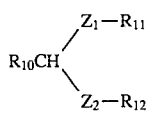

Formula F-7 wherein $R_{10}$ is a hydrogen atom or an aliphatic group, $R_{11}$ and $R_{12}$ each represent an aliphatic or aryl group, and $R_{11}$ and $R_{12}$ may form a cycle by bonding each other. $Z_1$ and $Z_2$ each represent an oxygen, sulfur atom or —N($R_{13}$)—, with proviso that $Z_1$ and $Z_2$ are not —N($R_{13}$)— at the same time. $R_{13}$ is a hydrogen atom, a hydroxy, aliphatic or aryl group.

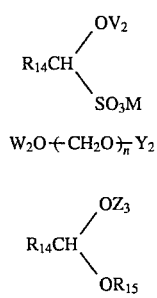

Formula F-8

$W_2O$-$(CH_2O)_n$-$Y_2$    Formula F-9

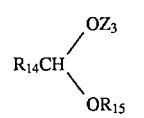

Formula F-10 wherein $R_{14}$ a hydrogen atom or an aliphatic group, $V_2$ is a group releasing upon hydrolysis. M is a cation. $W_2$ and $Y_2$ is a hydrogen atom or a group releasing upon hydrolysis, n is an integer of 1 to 10. $Z_3$ represents a hydrogen atom, an aliphatic or aryl group or a group releasing upon hydrolysis. $R_{15}$ is an aliphatic or aryl group. $Z_3$ may form a cycle by bonding to $R_{15}$.

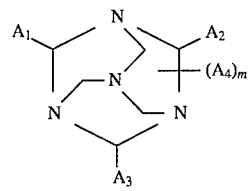

Formula F-11 wherein $A_1$ to $A_4$ each represent a hydrogen atom, an alkyl, aryl, or pyridyl group, m is 0 or 1.

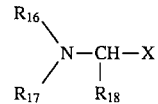

Formula F-12 wherein $R_{16}$, $R_{17}$ and $R_{18}$ each represent a hydrogen atom, aklkyl or aryl group, X is a nitrogen containing heterocycle.

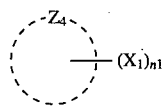

Formula F-13 wherein $Z_4$ is a substituted or nonsubstituted carbon atom cycle or a non-metallic atom group to form a substituted or nonsubstituted heterocycle, $X_1$ is an aldehyde, —CH(OR$_{19}$)(OR$_{20}$) or —CH(OH)(OR$_{19}$), $R_{19}$ and $R_{20}$ each is a lower alkyl group, and $n_1$ is an integer of 1 to 4.

Compounds represented by formulas F-1 through F-13 are described.

With respect to formula F-1, the definitions of the monovalent organic groups represented by $R_1$ through $R_6$ are as described on pages 18 and 19 of Japanese Patent Application No. 257959/1990. Examples of these compounds include F-1-1 through F-1-16 described on pages 20 through 23 of the same application, which are not to be construed as limitative.

Preferably, these hexahydrotriazine compounds represented by formula F-1 are used at content ratios from 0.05 to 50 g, more preferably from 0.1 to 20 g per liter of fixer or bleach-fixer.

Typical examples of N-methylol compounds represented by formula F-2, F-3 or F-4 include F-2-1, F-2-2, F-3-1 through F-3-4 and F-4-1 through F-4-3 described on page 24 of Japanese Patent Application No. 2579579/1990, which are not to be construed as limitative.

The amount of addition of compounds represented by formulas F-2 through F-4 is preferably 0.05 to 20 g, more preferably 0.1 to 10 g per liter of fixer or bleach-fixer.

With respect to formulas F-5 and F-6, the definitions of the electron-attracting groups represented by $V_1$ and $W_1$, the group represented by $Y_1$, which splits off upon hydrolysis, the nitrogen-containing heterocycle represented by Z, the nitrogen-containing heterocycle which may be formed by $V_1$ and $W_1$, etc. are as described on pages 25 through 30 of Japanese Patent Application No. 257959/1990. Typical examples of these compounds include F-5-1 through F-5-8 and F-6-1 through F-6-10 described on pages 31 through 33 of the same application, which are not to be construed as limitative.

With respect to formula F-7, the definitions of the aliphatic and allyl groups represented by $R_{10}$, $R_{11}$, $R_{12}$ and $R_{13}$, and the ring which may be formed by $R_{11}$ and $R_{12}$, are as described on pages 34 through 36 of Japanese Patent Application No. 257959/1990. Typical examples of these compounds include F-7-1 through F-7-10 described on page 37 of the same application, which are not to be construed as limitative.

With respect to formulas F-8 through F-10, the definitions of the aliphatic hydrocarbon groups represented by $R_{14}$, $R_{15}$ and $Z_3$, the groups represented by $V_2$, $W_2$ and $Z_3$, which split off upon hydrolysis, the ring which may be formed by $R_{15}$ and $Z_3$, and the cation represented by M are as described on pages 38 through 41 of Japanese Patent Application No. 257959/1990. Typical examples of these compounds include F-8-1 through F-8-4 and F-10-1 through F-10-9 described on pages 42 and 43 of the same application, which are not to be construed as limitative.

The amount of addition of compounds represented by formulas F-5 through F-10 is preferably 0.01 to 20 g, more preferably 0.03 to 15 g, and still more preferably 0.05 to 10 g per liter of fixer or bleach-fixer.

With respect to formula F-11, the definitions of the alkyl and alkenyl groups represented by $A_1$ through $A_4$ are as described on page 44 of Japanese Patent Application No. 257959/1990. Typical examples of these compounds include F-11-1 through F-11-25 described on pages 46 through 53 of the same application, some of which are commercially available.

With respect to formula F-12, the definitions of the alkyl or aryl groups represented by $R_{16}$, $R_{17}$ and $R_{18}$, and the nitrogen-containing heterocyclic group represented by X are as described in paragraph 0044 of Japanese Patent Application No. 33452/1992. Typical examples of these compounds include F-1 through F-76 described in paragraphs 0046 through 0051 of the same application, many of which are commercially available.

The amount of addition of compounds represented by formula F-12 is preferably 0.05 to 20 g, more preferably 0.1 to 15 g, and still more preferably 0.5 to 10 g per liter of stabilizer.

With respect to formula F-13, the definition of the carbon ring or heterocycle represented by $Z_4$ is as described in paragraphs 0027 through 0029 of Japanese Patent Application No. 226021/1991. Typical examples of these compounds include F-1 through F-77 described in paragraphs 0033 through 0037 of the same application, many of which are commercially available.

The compound represented by formula F-13 is used in the stabilizer at the same amounts of addition as with the compound of formula F-12.

Of the compounds represented by formulas F-1 through F-13, the following are particularly preferable.

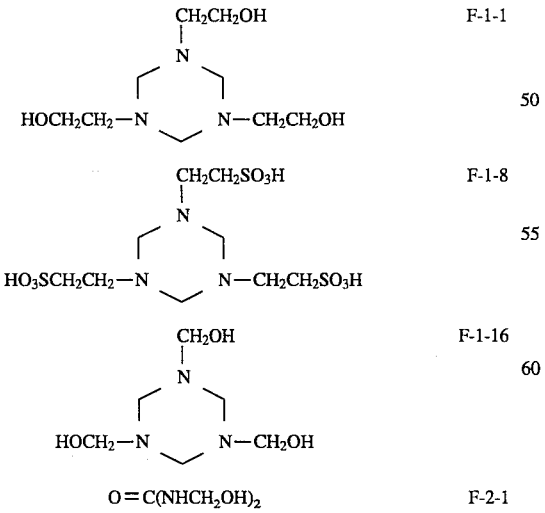

$O = C(NHCH_2OH)_2$     F-2-1

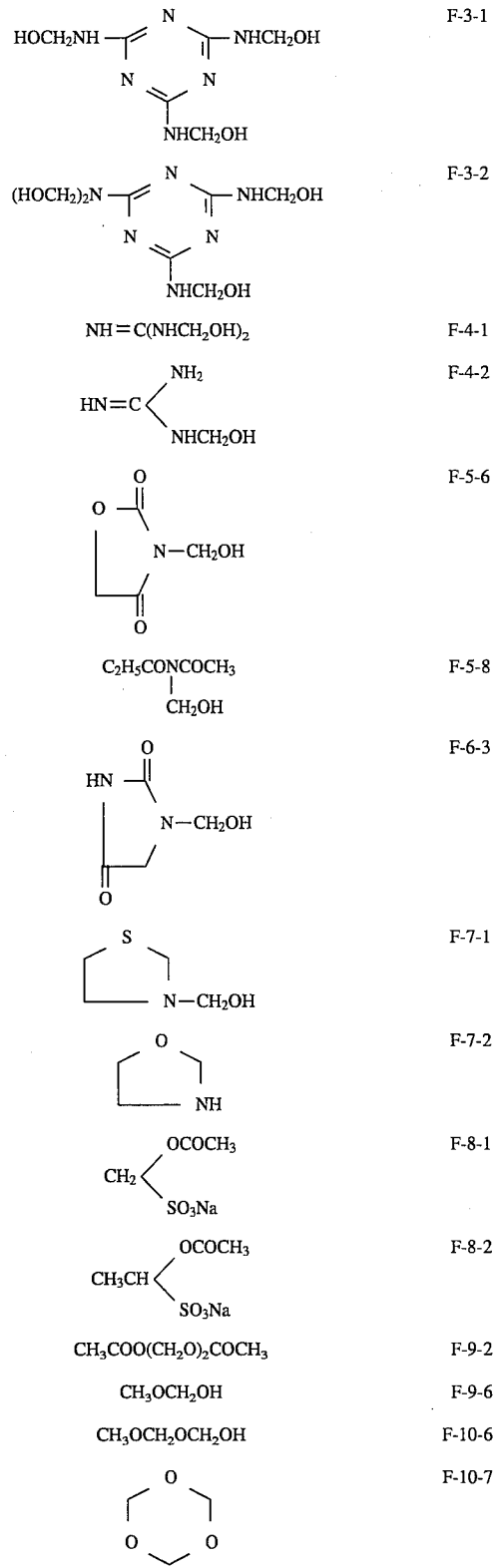

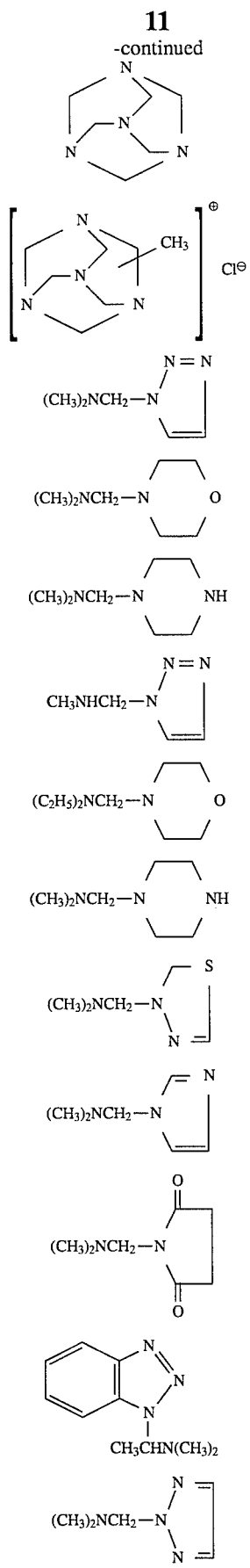

-continued

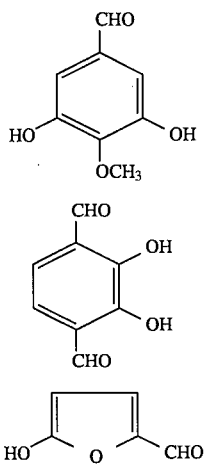

F-13-24

F-13-52

F-13-61

Although the silver halide grains used in the silver halide color photographic light-sensitive material (hereinafter simply referred to as "light-sensitive material") to which the recycling method of the present invention is applied may be any of silver chloride, silver chlorobromide, silver iodobromide and silver chloroiodobromide, it is preferable that the silver halide grains of color printing paper contain not lower than 90 mol % silver chloride grains, more preferably not lower than 95 mol %, and most preferably not lower than 98 mol % to obtain the desired effect of the present invention.

The magenta coupler contained in the light-sensitive material for the present invention is preferably at least one of compounds represented by the following formulas 2eq-1, 2eq-2, 2eq-3 and 2eq-4.

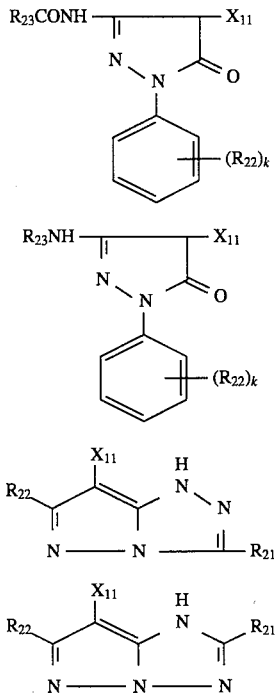

With respect to the above formulas 2eq-1 through 2eq-4, $R_{21}$, $R_{22}$ and $R_{23}$ independently represent a substituent; $X_{11}$ represents a group capable of splitting off upon coupling reaction with the oxidation product of an aromatic primary amine developing agent.

$R_{21}$ and $R_{22}$ are not particularly limited in kind. Typical examples thereof include alkyl, aryl, anilino, acylamino, sulfonamide, alkylthio, arylthio, alkenyl and cycloalkyl groups. $R_{23}$ is exemplified by alkyl, cycloalkyl, aryl and heterocyclic groups. These groups may have a substituent.

With respect to these 2-equivalent magenta couplers, $X_{11}$ is preferably a halogen atom, an alkylthio group, an arylthio group, an aryloxy group, an acyloxy group, a nitrogen-containing heterocyclic group, an alkylene group or the like.

With respect to formulas 2eq-1 and 2eq-2, a dimer or higher polymer may be formed at $R_{22}$, $R_{23}$ or $X_{11}$. With respect to formulas 2eq-3 and 2eq-4, a dimer or higher polymer may be formed at $R_{21}$, $R_{22}$ or $X_{11}$.

Typical examples of these magenta couplers include M-1 through M-39 described on pages 98 through 109 of Japanese Patent Application No. 337707/1990, with particular preference given to M-1, M-3, M-15, M-18, M-25, M-29 and M-30.

When a distillate obtained by evaporative concentration of a photographic processing waste liquid under a reduced pressure is used to prepare a color developer, it is preferable that the developer contains at least one kind of the compound represented by the following formula I or at least one monosaccharide.

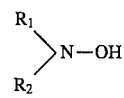

Formula I wherein $R_1$ and $R_2$ independently represent an alkyl group, an aryl group, an $R_3CO$-group or a hydrogen atom, each of which may be substituted ($R_1$ and $R_2$ do not represent a hydrogen atom at the same time); $R_3$ represents an alkyl group, an alkoxy group or an aryl group.

In this instance the silver halide emulsion of the silver halide photographic light-sensitive material to be processed by the color developer has a silver chloride content of, preferably, not lower than 80 mol %.

The replenishing rate for the color developer is, preferably, not higher than 120 cc per $m^2$ of the silver halide photographic light-sensitive material.

It is a preferred mode of embodiment of the present invention to add a hydroxylamine compound represented by formula I and/or a monosaccharide to the color developer prepared with a distillate obtained by the method of the present invention, since it is highly effective in the prevention of oxidation of the color developing agent.

The alkyl groups represented by $R_1$ and $R_2$ in formula I, which may be substituted, are preferably alkyl groups having 1 to 3 carbon atoms, and they may be identical or different. Substituents for these alkyl groups include a hydroxyl group, a sulfone group, a phosphone group and an alkoxy group.

Compounds represented by formula I are described in U.S. Pat. Nos. 3,287,125, 3,293,034 and 3,287,124 and other publications. Particularly preferable example compounds are given below.

| Example compounds No. | $R_1$ | $R_2$ |
|---|---|---|
| A-1 | $-C_2H_5$ | $-C_2H_5$ |
| A-2 | $-CH_3$ | $-CH_3$ |
| A-3 | $-C_3H_7(n)$ | $-C_3H_7(n)$ |
| A-4 | $-C_3H_7(i)$ | $-C_3H_7(i)$ |
| A-5 | $-CH_3$ | $-C_2H_5$ |
| A-6 | $-C_2H_5$ | $-C_3H_7(i)$ |
| A-7 | $-CH_3$ | $-C_3H_7(i)$ |
| A-8 | $-H$ | $-C_2H_5$ |
| A-9 | $-H$ | $-C_3H_7(n)$ |

-continued

| Example compounds No. | $R_1$ | $R_2$ |
|---|---|---|
| A-10 | —H | —CH$_3$ |
| A-11 | —H | —C$_3$H$_7$(i) |
| A-12 | —C$_2$H$_5$ | —C$_2$H$_4$OCH$_3$ |
| A-13 | —C$_2$H$_4$OH | —C$_2$H$_4$OH |
| A-14 | —C$_2$H$_4$SO$_3$H | —C$_2$H$_5$ |
| A-15 | —C$_2$H$_4$COOH | —C$_2$H$_4$COOH |
| A-16 | —CH$_3$ | —C$_2$H$_4$OCH$_3$ |
| A-17 | —C$_2$H$_4$OCH$_3$ | —C$_2$H$_4$OCH$_3$ |
| A-18 | —C$_2$H$_4$OC$_2$H$_5$ | —C$_2$H$_4$OC$_2$H$_5$ |
| A-19 | —C$_3$H$_6$OCH$_3$ | —C$_3$H$_6$OCH$_3$ |
| A-20 | —C$_2$H$_5$ | —C$_2$H$_4$OC$_2$H$_5$ |
| A-21 | —C$_3$H$_7$ | —C$_2$H$_4$OCH$_3$ |
| A-22 | —CH$_3$ | —C$_2$H$_4$OC$_2$H$_5$ |
| A-23 | —CH$_3$ | —CH$_2$OCH$_3$ |
| A-24 | —C$_2$H$_5$ | —CH$_2$OC$_2$H$_5$ |
| A-25 | —CH$_2$OCH$_3$ | —CH$_2$OCH$_3$ |
| A-26 | —C$_2$H$_5$ | —C$_2$H$_4$OC$_3$H$_7$ |
| A-27 | —C$_3$H$_6$OC$_3$H$_7$ | —C$_3$H$_6$OC$_3$H$_7$ |
| A-28 | —CH$_2$CH$_2$SO$_3$H | —CH$_2$CH$_2$SO$_3$H |
| A-29 | —CH$_2$CH$_2$PO$_3$H$_2$ | —CH$_2$CH$_2$PO$_3$H$_2$ |
| A-30 | —H | —CH$_2$CH$_2$OH |
| A-31 | —H | —CH$_2$CH$_2$SO$_3$H |

A-32 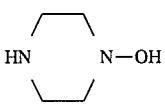

A-33 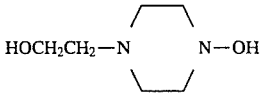

A-34 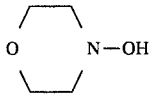

A-35 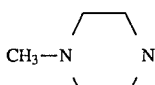

A-36 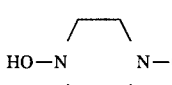

A-37 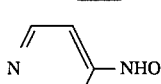

A-38 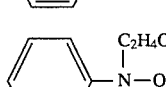

A-39 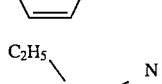

A-40    CH$_3$CO—NHOH

A-41 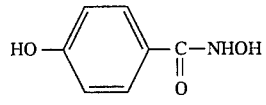

A-42 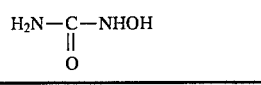

A-43    H$_2$N—C(=O)—NHOH

These compounds represented by formula I are normally used in the form of free amine, hydrochloride, sulfate, p-toluenesulfonate, oxalate, phosphate, acetate and others.

The concentration of the compound represented by formula I in the color developer is normally 0.4 to 100 g/l, preferably 1.0 to 60 g/l, and more preferably 2 to 30 g/l.

Of these typical examples compounds represented by formula I, A-1, A-2, A-10, A-13, A-14, A-15, A-17, A-28, A-29 and A-34 are preferably used in the present invention, with particular preference given to those having high water solubility, i.e., A-13, A-14, A-15, A-17, A-28, A-29 and A-34.

Although a compound represented by formula I may be used in combination with conventional hydroxylamine and various organic preservatives, it is preferable, from the viewpoint of developability, not to use hydroxylamine.

These compounds of formula I may be used singly or in combination, without affecting the developability.

In the present invention, the silver halide photographic light-sensitive material to be processed using an automatic processing machine for color printing paper (hereinafter referred to as an automatic processing machine) has a silver chloride content of preferably not lower than 80 mol %, more preferably not lower than 95 mol %, and still more preferably not lower than 98 mol % in the silver halide emulsion coated on the support. Recently available color printing papers are of the quick access type, having high silver chloride contents to ensure rapid processing and lower replenishing rates. Typical examples of such light-sensitive materials include Konica Color QA Paper Type A5, produced by Konica Corporation.

In the automatic processing machine relating to the present invention, wherein images are printed on color printing paper via a color negative film using an automatic printer, to keep constant the developing activity of the color developer, a given amount of replenisher is supplied upon processing of a given unit of the color printing paper for the purposes of compensating the loss of components consumed during development of the color printing paper and of diluting and discharging the developing retarding substances dissolving from the emulsion.

Accordingly, it is a preferred embodiment of the present invention to reduce the replenishing rate below 120 cc, preferably below 100 cc, and more preferably below 82 cc per m$^2$ of the light-sensitive material processed.

In the present invention, the monosaccharide generically refers to a wide range of derivatives, including simple polyhydroxyaldehyde, polyhydroxy ketone, reduced derivatives thereof, oxidized derivatives thereof, deoxy derivatives thereof, amino derivatives thereof and thio derivatives thereof. Many saccharides are represented by the formula $C_nH_{2n}O_n$. In the present invention, the monosaccharide is defined to include compounds derived from the sugar skeleton represented by this formula. Of such monosaccharides, those having 3 to 7 carbon atoms, e.g., triose, tetrose, pentose, hexose, heptose and derivatives thereof are particularly preferable.

The monosaccharide for the present invention is exemplified as follows:

EXAMPLE COMPOUNDS

B-1 Glyceraldehyde
B-2 Dihydroxyacetone (including dimers)
B-3 D-erythrose
B-4 L-erythrose
B-5 D-threose
B-6 L-threose
B-7 D-ribose
B-8 L-ribose
B-9 D-arabinose
B-10 L-arabinose
B-11 D-xylose
B-12 L-xylose
B-13 D-lyxose
B-14 L-lyxose
B-15 D-xylulose
B-16 L-xylulose
B-17 D-ribulose
B-18 L-ribulose
B-19 2-deoxy-D-ribose
B-20 D-allose
B-21 L-allose
B-22 D-altrose
B-23 L-altrose
B-24 D-glucose
B-25 L-glucose
B-26 D-mannose
B-27 L-mannose
B-28 D-gulose
B-29 L-gulose
B-30 D-idose
B-31 L-idose
B-32 D-galactose
B-33 L-galactose
B-34 D-talose
B-35 L-talose
B-36 D-quinovose
B-37 Digitalose
B-38 Digitoxose
B-39 cymarose
B-40 D-sorbose
B-41 L-sorbose
B-42 D-tagatose
B-43 D-fucose
B-44 L-fucose
B-45 2-deoxy-D-glucose
B-46 D-psicose
B-47 D-fructose
B-48 L-fructose
B-49 L-rhamnose
B-50 D-glucosamine
B-51 D-galactosamine
B-52 D-mannosamine
B-53 D-glycero-D-galactoheptose
B-54 D-glycero-D-mannoheptose
B-55 D-glycero-L-mannoheptose
B-56 D-glycero-D-gloheptose
B-57 D-glycero-D-idoheptose
B-58 D-glycero-L-glucoheptose
B-59 D-glycero-L-taloheptose
B-60 D-altroheptulose
B-61 D-mannoheptulose
B-62 D-altro-3-heptulose
B-63 D-glucuronic acid
B-64 L-glucuronic acid
B-65 N-acetyl-D-glucosamine Of these example compounds preferably used are B-1, B-7, B-8, B-9, B-10, B-11, B-12, B-17, B-19, B-20, B-24, B-25, B-26, B-27, B-32, B-33, B-40, B-41, B-47, B-48, B-50, B-63 and B-65, with greater preference given to B-1, B-7, B-8, B-40, B-41, B-47, B-48 and B-50.

In the present invention, the amount of addition of monosaccharides is 1.5 to $10^{-3}$ to $1.5 \times 10^{-1}$ mol, preferably $3.0 \times 10^{-3}$ to $9.0 \times 10^{-2}$ mol, more preferably $4.5 \times 10^{-3}$ to $6.0 \times 10^{-2}$ mol per liter of color developer.

Figure 2:
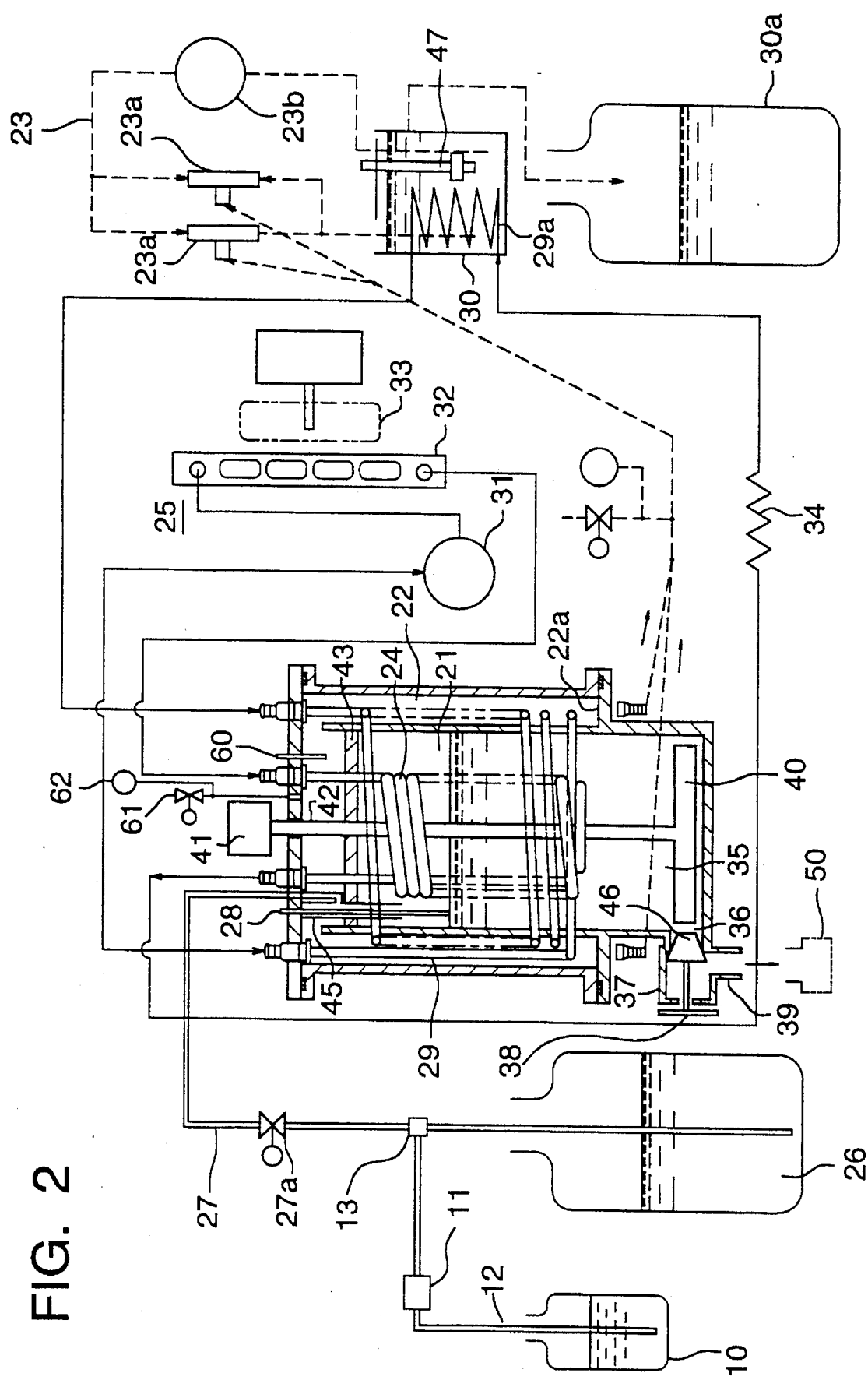
Figure 3:
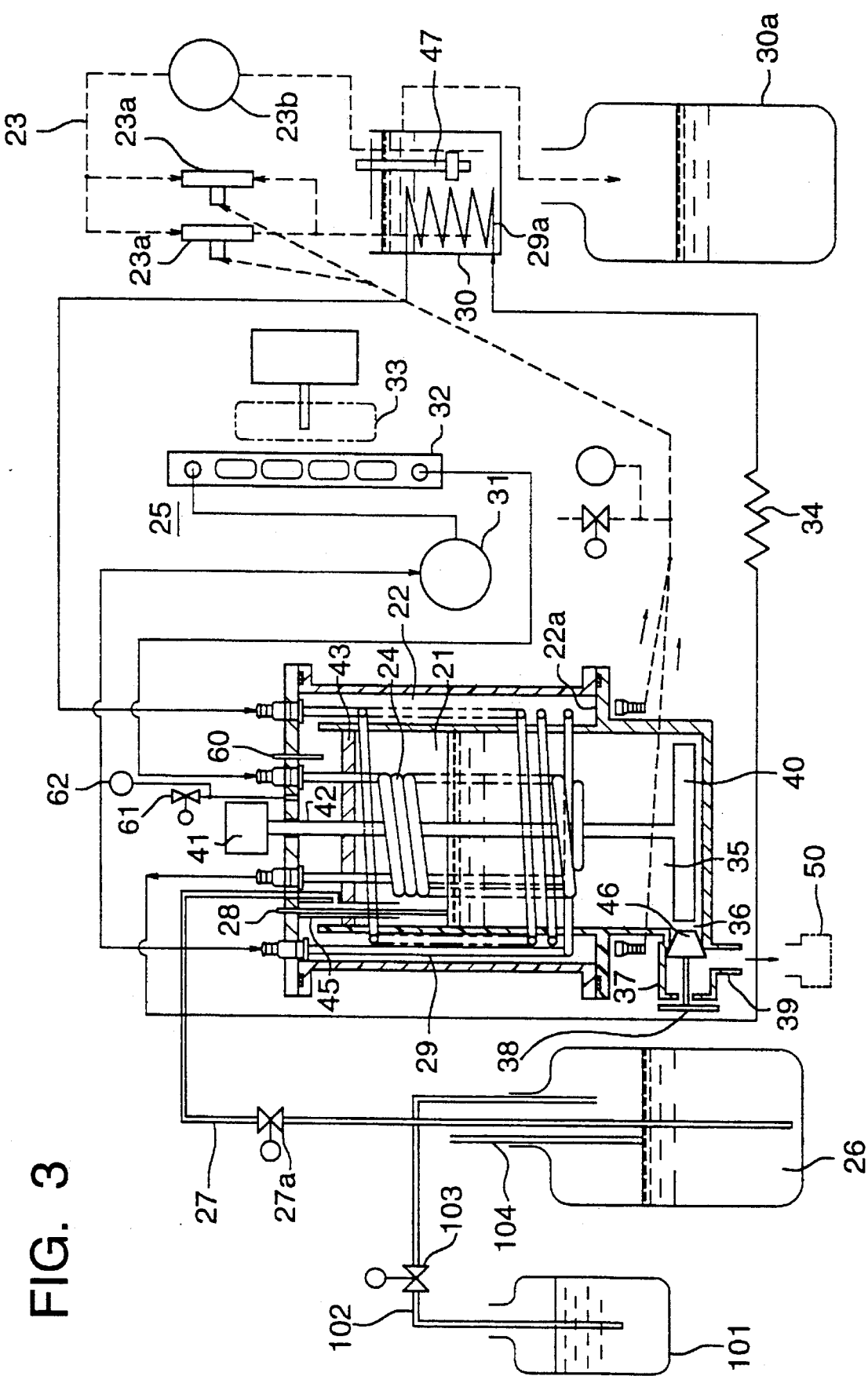

The evaporative concentrator used for the present invention, which distills photographic processing waste liquid, is schematized in FIGS. 1–3, wherein each figure shares a common central unit and features and numbers for the same.

In FIG. 1, the numerical symbol 21 denotes an evaporating chamber enduring reduced pressure lined with Teflon, SUS16, glass coating etc. In this evaporating chamber 21 is injected and retained an aqueous solution such as photographic processing waste liquid. The numerical symbol 22 denotes a cooling chamber concentrically provided outside evaporating chamber 21. The upper portion of cooling chamber 22 communicates to evaporating chamber 21 and is connected to pressure reducer 23 to permit pressure reduction. It is a well-known fact that when the inside pressure of evaporating chamber 21 is reduced below the atmospheric pressure, boiling occurs at a temperature below the boiling point. In this embodiment, evaporation at low temperatures, where bubbling is not likely, is carried out under such reduced pressure. Although pressure reducer 23 may be based on a vacuum pump, ejector and other means, it is preferable to use the hydraulic flow ejector method, or the so-called hydraulic flow pump method, which is preferred since no odorous components are released into the atmosphere.

The numerical symbol 24 denotes a heat releaser spirally arranged in evaporating chamber 21. Compressor 31, heat releaser 24, pressure reducer 23, heat absorber 29 and coolant air-cooling apparatus 32 are sequentially connected to constitute heat pump system 25 containing a heating medium. Heat releaser 24 of this heat pump system 25 constitutes a heater, whose surface temperature is preferably regulated at 100° C. or lower during evaporation under reduced pressure, particularly between 30° C. and 40° C. for prevention of odorous gas generation. This temperature management is preferably based on a method wherein fan 33 is switched on/off according to the temperature of the concentrate in evaporating chamber 21 or a method wherein fan 33 is switched on/off according to the temperature and pressure of the heating side of the coolant (heating medium). The lower portion of heat releaser 24 of heat pump system 25 is immersed in aqueous solution W, while the upper portion is exposed to the air above the liquid surface. The reason why heat releaser 24 is spirally arranged over the liquid and the air is that the liquid and liquid surface are efficiently heated simultaneously.

Heating media commonly used in heat pump system 25 include ammonia and freon, with preference given to the freon gas HCFC-22 from the viewpoint of evaporative concentration efficiency. Compressor 31 of heat pump system 25 may be based on various methods such as the rotary method, and compressors used in air conditioning equipment such as freezers, refrigerators and air conditioners can also be used. It is also possible to use a Peltier element in place of the heat pump system containing a heating medium.

The present invention uses the double-chamber construction, wherein evaporating chamber 21 is arranged inside while cooling chamber 22 is arranged outside, which allows compact overall configuration. Also, demister 43 is equipped above the liquid surface of evaporating chamber 21. Above demister 43, evaporating chamber 21 and cooling chamber 22 communicate mutually, whereby the concentrated components in evaporating chamber 21 are prevented from flying into the condensed water in cooling chamber 22, thus ensuring stable evaporative concentration. This demister 43 is an assembly of sintered particles of a spongy fibrous material having a porosity of not lower than 80% and is 1 cm or thicker. Practically, Saran Rock (Product of Asahi Chemical Co., Ltd.), prepared by adhering Saran fiber with an adhesive, is preferred.

Preferably, operation of this evaporative concentrator is started at the time of the first activation of the hydraulic flow pump to reduce pressure, at which time liquid supply is started. After a given level of reduced pressure is reached, compressor 31 is activated to initiate ordinary operation of evaporative concentration. The pressure reduction status can be checked by means of pressure sensor 62, and the next step may be initiated forcedly after a given period of time.

In FIG. 2, the numerical symbol 10 denotes a defoaming agent tank, and 11 denotes a supply pump for injecting the defoaming agent to the photographic processing waste liquid supplying system for evaporative concentration via piping 12. The numerical symbol 13 denotes a joint where the photographic processing waste liquid and the defoaming agent are mixed, and it may be equipped with a backflow checking mechanism or a simple piping joint. In the case of simple piping joint, it is preferable to use a bellows pump as supply pump 11.

In FIG. 3, the numerical symbol 101 denotes an acid tank, and 102 denotes a supplying means, equipped with electromagnetic valve 103, for supplying the acid from acid tank 101 to aqueous solution tank 26. Acid supplying means 102 is activated when liquid surface level detector 104 detects the drop of liquid surface level in aqueous solution tank 26 to a certain level by the liquid surface label detector 104. In another mode of embodiment of the present invention, the acid is supplied on the basis of detection of the liquid volume in aqueous solution tank 26 without liquid surface level detector 104. In still another mode of embodiment of the present invention, the acid is automatically supplied, or manually supplied in the form of solid (e.g., powder, tablets) or liquid, to evaporating chamber 21 and condensed water tank 30, as well as to aqueous solution tank 26.

The numerical symbol 26 denotes an aqueous solution tank, and 27 denotes an aqueous solution supplying means, equipped with electromagnetic valve 27a, for supplying the aqueous solution from tank 26 to evaporating chamber 21. This aqueous solution supplying means 27 is activated upon drop of the liquid surface below a given level due to thermal evaporation in evaporating chamber 21, as detected by liquid surface level detector 28. The aqueous solution drawn up by aqueous solution supplying means 27 is supplied to evaporating chamber 21 while washing the liquid surface level detecting electrode of liquid surface level detector 28. An aeration apparatus may be arranged in aqueous solution tank 26, which enhances the effect of the acid used in the present invention. Although the in-the-liquid and in-the-air portions of heat releaser 24 are usually managed at the same temperature, the surface temperature of the in-the-air portion is substantially higher than that of the in-the-liquid portion due to a difference in heat conducting effect. Applying the supplied waste liquid directly to heat releaser 24 can therefore result in malodorous gas generation due to rapid heating. To cope with this phenomenon, it is necessary to adjust the supply rate or reduce the temperature of the in-the-air portion of heat releaser 24 below the critical temperature for gas generation. Alternatively, the in-the-liquid and in-the-air portions of heat releaser 24 may be separately adjusted to appropriate temperature.

Liquid surface level detector 28 is an electrode type liquid surface level detector wherein an electrode immersed in the aqueous solution in evaporating chamber 21 detects the liquid surface level. To prevent malfunctioning of liquid surface level detector 28 due to concentrated sludge etc., the electrode is at least partially covered with cylinder 45, and the aqueous solution from tank 26 is injected into the inside of cylinder 45 and supplied to evaporating chamber 21. Also, for the same purpose, a part of the electrode of liquid surface level detector 28 is coated with a non-conductive material, preferably a polymeric heat shrinking tube with water-repellency, a Teflon-based heat shrinking tube being the best. Cylinder 45 is also preferably made of a non-conductive material such as a plastic material, with a lining of silicone or Teflon.

On the basis of the detection result from liquid surface level detector 28, aqueous solution supplying means 27 is controlled. However, irrespective of this detection result, at initiation of evaporative concentration operation, a given amount of aqueous solution, i.e., an amount which does not lead to a rise in the surface level of the aqueous solution in evaporating chamber 21 to interfere with operation, e.g., a volume as great as 1/50 to 1/5 of the capacity of evaporating chamber 21, is supplied to evaporating chamber 21. This control prevents malfunctioning, due to sludge adhesion to liquid surface level detector 28, in the absence of starting liquid.

In cases where liquid surface level detector 28 is continuously detecting the liquid for a given period of time during operation, this detection may be erroneous due to sludge adhesion to liquid surface level detector 28. To prevent this, it is preferable to forcedly supply a given amount of aqueous solution, whereby malfunctioning of liquid surface level detector 28 is prevented.

Also, the presence of a large amount of a gasifying component or a surfactant component in the aqueous solution can result in foaming of the aqueous solution upon evaporation, the resulting foam being pushed upward to the upper portion of evaporating chamber 21 and entering in the condensed water in cooling chamber 22. To prevent this, electrode type liquid surface level detector 60, separate from liquid surface level detector 28, is provided in the upper portion of evaporating chamber 21. Upon detection of foaming by this liquid surface level detector 60, electromagnetic valve 61 is opened to break the reduced pressure condition in evaporating chamber 21 to prevent entry of the concentrated liquid into the condensed water.

It is also preferable to provide a mechanism for injecting a silicon or fluorine type defoaming agent into evaporating chamber 21.

Heat absorber 29 of the above-described heat pump system 25 is a cooler installed in cooling chamber 22 and cools and condenses the steam generated by evaporation of the aqueous solution in evaporating chamber 21 and supplied to cooling chamber 22 via the upper space of the evaporating chamber. The condensed water thus produced is retained in bottom portion 22a of cooling chamber 22 and recovered into condensed water tank 30, a recovery container installed outside cooling chamber 22. This recovery is achieved by pressure reducer 23 equipped with ejector 23a. Specifically, when the water in condensed water tank 30 is pumped up by pump 23b and returned to condensed water tank 30 via the vertical piping of ejector 23a, a vacuum zone is produced at the intersection between the vertical and horizontal pipes. Therefore the liquid retained in bottom portion 22a of cooling chamber 22, which communicates to the horizontal pipe, the air in cooling chamber 22 and the air in evaporating chamber 21, which communicates to cooling chamber 22, are aspirated, contributing to stabilization of the reduced pressure state in both chambers 21 and 22. Here, sequential performance of condensation and condensed water recovery is effective in preventing the loss of pressure reduction balance, i.e., the pressure rise in evaporating chamber 21 by the steam generated, by immediately cooling and condensing the steam. Also, the overflow water from condensed water tank 30 is retained in retention container 30a. Ejector 23a is preferably located below bottom portion 22a.

Coolant air cooler 32, installed on the upstream side of heat releaser 24 of the above-described heat pump system 25, serves to cool the coolant, compressively heated by compressor 31, to an appropriate preset temperature, and is equipped with air cooling fan 33. Heat pump system 25 is equipped with capillary tube 34 which serves as an expansion valve, on the downstream side of heat releaser 24. The heat absorbing portion on the downstream side of capillary tube 34 is used as cooler 29a for the water in condensed water tank 30 and as heat absorber 29 in cooling chamber 22. The upstream and downstream sides over capillary tube 34 are the heating and cooling zones, respectively. However, the coolant passing through heat absorber 29 of cooling chamber 22 is refluxed to compressor 31.

In the bottom portion of evaporating chamber 21 is provided slurry reservoir 35 for retaining the highly concentrated slurry resulting from repeated evaporative concentration. On the outer face of the side wall at the same level as the bottom of slurry reservoir 35 is projected slurry outlet 36, which is plugged tight with plugging means 37. Plugging means 37 may be configured with a ball valve, butterfly valve and slide valve. In the figure, plugging means 37 is configured with backing plug 46 to maintain the reduced pressure state in evaporating chamber 21; by pulling or pushing lever 38 connected to backing plug 46, slurry outlet 36 can be opened or closed.

Also, slurry reservoir 35 is equipped with impeller 40, which is fixed to the lower end of output shaft 42 of drive 41 installed on top of evaporating chamber 21. This impeller 40 is configured to allow the entire surface of the inner base of slurry reservoir 35 to be stirred and to allow the slurry to be easily discharged toward slurry outlet 36. Of course, impeller 40 may be configured so that it can be manually rotated via a handle. Part of impeller 40 passes near slurry outlet 36, and the concentrate is shaken by rotating impeller 40 before the slurry is taken out via slurry outlet 36, to completely remove the residual slurry adhering to the inner wall of evaporating chamber 21, particularly the upper heating portion thereof, from evaporating chamber 21.

The tip of slurry exit 39 opening below plugging means 37 allows locking of slurry recovery container 50, which may be a bag-like flexible container. Slurry recovery container 50 is connected to slurry exit 39 via the same seal as the cap (not illustrated) attached to such recover container, e.g., a screwable or elastically detachable seal. This allows the operator to easily take out the slurry without hand staining.

To remove the slurry causing scale clogging during ordinary concentration which cannot be removed from evaporating chamber 21 during regular maintenance, particularly to remove the slurry adhering to the intermediate portion of evaporating chamber 21, a descaling blade (not illustrated) may be used in place of impeller 40. The slurry descaling blade may be manually rotated from below.

In cases where the slurry is so hard that the motion of impeller 40 is hampered, a belt type transmission is inserted in a part of the driving mechanism between drive 41 and impeller 40 to prevent drive 41 and impeller 40 from undergoing excess load. Since the slurry, even initially hard, becomes fluid with stirring, impeller 40 first rotates while the belt is slipping, and then impeller 40 becomes easily rotatable.

Backing plug 46 of plugging means 37 is a rubber plug, for example. To prevent it from being excessively pushed in, a stopper (not illustrated) is attached to prevent backing plug 46 from entering into slurry exit 39 over a given distance. Also provided is an element to prevent backing plug 46 from escaping in the opposite direction. Lever 38 also serves to prevent the slurry from spreading from slurry exit 39.

Liquid surface level detectors, e.g., those of the float type (not illustrated) are provided at least two positions, namely at an intermediate portion and near-base portion, of aqueous solution tank 26, which serve to control operation so that operation is started upon supply of the aqueous solution to the intermediate position of tank 26 and operation is terminated upon reduction in the liquid surface level near the base. Also, liquid surface level sensor 47 is equipped to condensed water tank 30, which serves as a controller to terminate system operation upon filling of condensed water tank 30.

Also, an aeration apparatus may be installed in condensed water tank 30 to remove deleterious components and enhance the effect of the acid supplied by acid supplying means 102.

Aqueous solution supplying means 27 is activated to inject waste liquid, i.e., an aqueous solution, into evaporating chamber 21 until a given water level as detected by the liquid surface level detector is reached, while tap water is injected into condensed water tank 30 and retained therein. Heat releaser 24 in evaporating chamber 21 is thereafter heated to a given temperature by the coolant flown by the action of compressor 31, while heat absorber 29 in cooling chamber 22 is cooled. On the other hand, pressure is reduced in cooling chamber 22 and evaporating chamber 21 via ejector 23a by the action of pump 23b; therefore, the waste liquid boils and evaporates at a temperature below its boiling pint.

The steam resulting from evaporation in evaporating chamber 21 enters in cooling chamber 22, via the upper space, where it is cooled and condensed to water drops, which are retained in bottom portion 22a of cooling chamber 22 and recovered by vacuum suction into condensed water tank 30 installed outside the cooling chamber. As the aqueous solution, injected in evaporating chamber 21, decreases with evaporation, aqueous solution supplying means 27 is enabled to supply the replenishing aqueous solution; evaporation is constantly compensated in evaporating chamber 21, so that the aqueous solution becomes gradually concentrated. The highly solidified components, in the form of slurry, are retained in slurry reservoir 35 installed in the bottom portion.

By constantly monitoring the temperature of the heating medium used in heat pump system 25, the degree of concentration is judged. When a given level of this temperature is reached, concentrating operation is terminated, lever 38 is pulled to remove backing plug 46 from plugging means 37 to open tightly plugged slurry outlet 36, and the slurry retained in the bottom portion of evaporating chamber 21 is taken out into slurry recovery container 50. In this take-out operation, rotary blade 40 is rotated by drive 41 to ensure efficient take-out of the slurry.

Since the present evaporative concentrator concentrates an aqueous solution as described above, it can be used for waste liquid treatment and original liquid concentration.

It is another preferred mode of embodiment of the present invention to adjust the waste liquid pH to 7.0 or lower, preferably 6.5 or lower by the addition of an acid prior to waste liquid injection into the evaporative concentrator.

Although the evaporative concentrator illustrated in FIG. 1 uses a heat pump as a heater and cooler, a Peltier element may be used instead as a heater and cooler. Even when a Peltier element is used for this purpose, the evaporative concentrator may be configured as illustrated in FIG. 1. The Peltier element is any element based on the Peltier effect. Peltier elements which can be used for this purpose include those produced by Thermovonics Co., Ltd.

EXAMPLES

Example 1

Using automatic processing machines CL-KP50QA and CL-PP1501QA, both produced by Konica Corporation, color negative film Super DD-100, after exposure for actual picture taking, and color paper QA Paper Type A5, both produced by Konica Corporation, were processed with CNK-4-40 and CPK-2-20 processing agents, produced by Konica Corporation. All discharged waste liquids, combined together, were concentrated under the conditions shown in Table 1, using the reduced pressure evaporative concentrator illustrated in FIG. 1. Using the resulting distillate to prepare N-1 (CNK-4-52 film developer replenisher), a running processing experiment was conducted until 100 liter of the replenisher prepared with the distillate was consumed.

Immediately before completion of the experiment, a color film, subjected to an ordinary procedure of exposure through an optical wedge, was processed and determined for the blue color density of transmitted light in the unexposed portion ($D_{min}(B)$) and the blue color density of transmitted light in the maximum exposure portion ($D_{max}(B)$).

The results are given in Table 1.

Sample No. 1-1 was conducted under the same conditions of distillation as described in Example 1 of Japanese Patent O.P.I. Publication No. 201442/1987.

Under the distillation temperature and pressure conditions of sample No. 1-8, almost no distillate was produced, i.e., distillation was difficult. As seen in sample Nos. 1-9 through 1-13, the amount of distillate increased as the distilling pressure decreased; a distillate was obtained very efficiently under the distilling conditions of sample No. 1-13.

As seen in Table 1, the present invention is favorable in that it results in no increased staining or reduced $D_{max}$.

Table 1 also shows that a combination of 90° C. temperature and 500 mmHg distilling pressure is preferable, a combination of 70° C. temperature and 240 mmHg distilling pressure is more preferable, a combination of 40° C. temperature and 55 mmHg distilling pressure is still more preferable, and a combination of 35° C. temperature and 45 mmHg distilling pressure is most preferable.

Sample Nos. 1-8 through 1-13 demonstrated that from the viewpoint of distillation efficiency, 700 mmHg is preferable, 200 mmHg is more preferable, 100 mmHg is still more preferable, 55 mmHg is yet more preferable, and 45 mmHg is most preferable.

The present invention also proved free of malodorous gas generation upon evaporative concentration and hence very favorable from an environmental viewpoint.

These findings show that the method of the present invention makes it possible to efficiently reduce the volume of waste liquid and reuse the water in the waste liquid.

Example 2

Running processing samples were conducted in the same manner as in Example 1 except that the distillates obtained in sample Nos. 1-1 and 1-13 in Example 1 were used to prepare a color negative film bleacher replenisher (CNK-4-40 processing solution).

A film processed immediately before completion of the running processing sample was examined for color reproduction failure and staining. Also examined was odor generation upon concentrating operation.

In the method of the present invention, using the distillate obtained by the distillation method of the present invention

TABLE 1

| Sample No. | Evaporation temperature (°C.) | Evaporation pressure (mmHg) | Transmission Dmin (B) | Transmission Dmax (B) | Remarks |
|---|---|---|---|---|---|
| 1-1 | 100 | 760 | 0.96 | 2.20 | Comparative |
| 1-2 | 90 | 700 | 0.92 | 2.59 | Inventive |
| 1-3 | 90 | 500 | 0.90 | 2.64 | Inventive |
| 1-4 | 70 | 240 | 0.90 | 2.70 | Inventive |
| 1-5 | 60 | 200 | 0.90 | 2.74 | Inventive |
| 1-6 | 50 | 100 | 0.90 | 2.76 | Inventive |
| 1-7 | 40 | 55 | 0.89 | 2.78 | Inventive |
| 1-8 | 35 | 760 | 0.88 | 2.80 | Comparative |
| 1-9 | 35 | 700 | 0.88 | 2.80 | Inventive |
| 1-10 | 35 | 200 | 0.88 | 2.80 | Inventive |
| 1-11 | 35 | 100 | 0.88 | 2.80 | Inventive |
| 1-12 | 35 | 55 | 0.88 | 2.80 | Inventive |
| 1-13 | 35 | 45 | 0.88 | 2.80 | Inventive |
| 1-14 | 25 | 25 | 0.88 | 2.80 | Inventive |
| 1-15 | 15 | 15 | 0.88 | 2.80 | Inventive |

(sample No. 1-13), neither color reproduction failure nor staining occurred, posing no problem in photographic processing performance. Nor was there any odor generation upon evaporative concentration. On the other hand, in the comparative method, using the distillate obtained by a comparative distillation method (sample No. 1-1), color reproduction failure and staining occurred, posing a problem in photographic processing performance. Also, odor was generated upon evaporative concentration.

These findings show that the method of the present invention makes it possible to efficiently reduce the volume of waste liquid and reuse the water in the waste liquid.

Example 3

Running processing samples were conducted in the same manner as in Example 1 except that the distillates obtained in sample Nos. 1-1 and 1-13 in Example 1 were used as a solvent to prepare a color negative film fixer replenisher (CNK-4-40 processing solution).

A film processed immediately before completion of the running processing sample was examined for fixation failure. In the method of the present invention, using the distillate obtained by the distillation method of the present invention (sample No. 1-13), no fixation failure occurred, posing absolutely no problem in photographic performance. On the other hand, in the comparative method, using the distillate obtained by a comparative method of distillation (sample No. 1-1), silver remained on the processed film, posing a problem of fixation failure.

These findings show that the method of the present invention makes it possible to efficiently reduce the volume of waste liquid and reuse the water in the waste liquid.

Example 4

Running processing samples were conducted in the same manner as in Example 1 except that the distillates obtained in sample Nos. 1-1 and 1-13 in Example 1 were used to prepare a film stabilizer replenisher (CNK-4-40 processing solution).

A film processed immediately before completion of the running processing sample was examined for staining. In the method of the present invention, using the distillate obtained by the distillation method of the present invention (sample No. 1-13), no staining occurred, posing absolutely no problem in photographic performance. On the other hand, in the comparative method, using the distillate obtained by a comparative method of distillation (sample No. 1-1), a problem arose of staining on the back face of the processed film.

These findings show that the method of the present invention makes it possible to efficiently reduce the volume of waste liquid and reuse the water in the waste liquid.

Example 5

Running processing samples were conducted in the same manner as in Example 1 except that the distilling temperature and pressure were changed as shown in Table 2 and the obtained distillate was used to prepare a printing paper color developer replenisher (CPK-2-20 processing solution).

A color printing paper, subjected to a conventional procedure of exposure through an optical wedge and processed immediately before completion of the running processing sample, was determined for the blue color density of reflected light in the unexposed portion ($D_{min}$ (B)) and the blue color density of reflected light in the maximum exposure portion ($D_{max}$ (B)).

The results are given in Table 2.

TABLE 2

| Sample No. | Evaporation temperature (°C.) | Evaporation pressure (mmHg) | Reflection Dmin (B) | Reflection Dmax (B) | Remarks |
| --- | --- | --- | --- | --- | --- |
| 2-1 | 100 | 760 | 0.06 | 1.55 | Comparative |
| 2-2 | 90 | 700 | 0.04 | 1.98 | Inventive |
| 2-3 | 90 | 500 | 0.04 | 2.10 | Inventive |
| 2-4 | 70 | 240 | 0.04 | 2.14 | Inventive |
| 2-5 | 60 | 200 | 0.04 | 2.15 | Inventive |
| 2-6 | 50 | 100 | 0.03 | 2.20 | Inventive |
| 2-7 | 40 | 55 | 0.02 | 2.28 | Inventive |
| 2-8 | 35 | 45 | 0.01 | 2.32 | Inventive |
| 2-9 | 25 | 25 | 0.01 | 2.32 | Inventive |
| 2-10 | 15 | 15 | 0.01 | 2.32 | Inventive |

Sample No. 2-1 was conducted under the same conditions of distillation as described in Example 1 of Japanese Patent O.P.I. Publication No. 20144/1987.

As seen in Table 2, the present invention is favorable in that it results in no increased staining or reduced $D_{max}$.

Table 2 also shows that a combination of 90° C. temperature and 500 mmHg distilling pressure is preferable, a combination of 70° C. temperature and 240 mmHg distilling pressure is more preferable, a combination of 40° C. temperature and 55 mmHg distilling pressure is still more preferable, and a combination of 35° C. temperature and 45 mmHg distilling pressure is most preferable.

The present invention also proved free of malodorous gas generation upon evaporative concentration and hence very favorable from an environmental viewpoint.

These findings show that the method of the present invention makes it possible to efficiently reduce the volume of waste liquid and reuse the water in the waste liquid.

Example 6

Running processing samples were conducted in the same manner as in Example 1 except that the distillates obtained in sample Nos. 1-1 and 1-13 in Example 1 were used to prepare a printing paper bleach-fixer replenisher (CPK-2-20 processing solution).

A printing paper processed immediately before completion of the running processing sample was examined for desilvering failure. In the method of the present invention, using the distillate obtained by the distillation method of the present invention (sample No. 1-13), no desilvering failure occurred, posing no problem in photographic performance. On the other hand, in the comparative method, using the distillate obtained by a comparative distillation method (sample No. 1-1), desilvering failure occurred, posing a problem.

These findings show that the method of the present invention makes it possible to efficiently reduce the volume of waste liquid and reuse the water in the waste liquid.

Example 7

Running processing samples were conducted in the same manner as in Example 1 except that the distillates obtained in sample Nos. 1-1 and 1-13 in Example 1 were used to prepare a printing paper stabilizer replenisher (CPK-2-20 processing solution).

A printing paper, subjected to a conventional procedure of stepwise exposure and processed immediately before completion of the running processing sample, was stored at 60° C. and 80% RH for 1 week, after which density fading in the maximum green density portion was determined. In the method of the present invention, using the distillate obtained by the distillation method of the present invention (sample No. 1-13), the degree of fading was lower than 5%, posing no problem. On the other hand, in the comparative method, using the distillate obtained by a comparative distillation method (sample No. 1-1), the degree of fading was as high as 20%, posing a problem.

These findings show that the method of the present invention makes it possible to efficiently reduce the volume of waste liquid and reuse the water in the waste liquid.

Example 8

Running processing samples were conducted in the same manner as in Example 1 except that the distillate obtained in sample No. 1-13 in Example 1 was used to prepare a film developer and replenisher (CNK-4-40 processing solutions), wherein the ammonia and ammonium salt in the tank solution and replenisher were partially or totally replaced with potassium hydroxide and potassium salt, respectively, so that the ammonium ion concentration in the combined waste liquid to be distilled would be about 3000, 2000, 1000, 500 and 0 ppm.

A film, subjected to a conventional procedure of exposure through an optical wedge and processed immediately before completion of the running processing sample, was determined for the blue color density of transmitted light in the unexposed portion ($D_{min}(B)$) and the blue color density of transmitted light in the maximum exposure portion ($D_{max}(B)$).

The results are given in Table 3.

TABLE 3

| Concentration of ammonium ion (measured) ppm | Transmission Dmin (B) | Transmission Dmax (B) |
| --- | --- | --- |
| 3040 | 0.91 | 2.57 |
| 2050 | 0.91 | 2.59 |
| 1990 | 0.90 | 2.68 |
| 1020 | 0.89 | 2.72 |
| 980 | 0.88 | 2.80 |
| 490 | 0.88 | 2.80 |
| 0 | 0.88 | 2.80 |

As seen in Table 3, the effect of the present invention is enhanced when the ammonium ion concentration is not higher than 2000 ppm, particularly not higher than 1000 ppm.

Example 9

Running processing samples were conducted in the same manner as in Example 1 except that the distillate obtained in sample No. 1-13 in Example 1 was used to prepare a printing paper color developer replenisher (CPK-2-20 processing solution), wherein the ammonia and ammonium salt in the tank solution and replenisher were partially or totally replaced with potassium hydroxide and potassium salt, respectively, so that the ammonium ion concentration in the combined waste liquid to be distilled would be about 3000, 2000, 1000, 500 and 0 ppm.

A printing paper, subjected to a conventional procedure of exposure through an optical wedge and processed immediately before completion of the running processing sample, was determined for the blue color density of reflected light in the unexposed portion ($D_{min}(B)$) and the blue color density of reflected light in the maximum exposure portion ($D_{max}(B)$).

The results are given in Table 4.

TABLE 4

| Concentration of ammonium ion (measured) ppm | Reflection Dmin (B) | Reflection Dmax (B) |
| --- | --- | --- |
| 3050 | 0.03 | 2.08 |
| 2060 | 0.03 | 2.14 |
| 2000 | 0.02 | 2.22 |
| 1030 | 0.02 | 2.24 |
| 990 | 0.01 | 2.32 |
| 480 | 0.01 | 2.32 |
| 0 | 0.01 | 2.32 |

As seen in Table 4, the effect of the present invention is enhanced when the ammonium ion concentration is not higher than 2000 ppm, particularly not higher than 1000 ppm.

Example 10

The same procedures as in Example 1 were followed except that the distillate obtained by the distillation method of the present invention (sample No. 1-13) was used as an evaporation compensator for the film developer, film bleacher, film fixer, film stabilizer, printing paper developer, printing paper bleach-fixer and printing paper stabilizer in the processing using the automatic processing machine. Photographic performance was not affected at all.

According to the present invention, water which can be used as a solvent for processing agents and an evaporation compensator is obtained without causing any problem in photographic processing, and the volume of waste liquid to be treated can be reduced without malodor generation.

Example 11

Using automatic processing machines CL-KP50QA for color negative films and CL-PP1501QA for color printing paper, both produced by Konica Corporation, color negative film Super DD-100, after exposure for actual picture taking, and QA Paper Type A5, after actual printing, both produced by Konica Corporation, were processed with Konica Process CNK-4-52 and CPK-2-20 processing agents. All discharged waste liquids, combined together, were concentrated, using the reduced pressure evaporative concentrator illustrated in FIG. 1. In the processing using a defoaming agent, FS Antifoam 90, produced by Dow Corning K. K., was supplied by bellows pump 11 set to supply 1 g of the defoaming agent per liter of waste liquid.

On the basis of the results of the preliminary test with varied reduced pressures and temperatures to determine the TOC (total organic carbon) content of the distillate, the waste liquid supplying rate for the evaporative concentrator was optimized.

The effect was assessed on the basis of the degree of odor generation (sensory evaluation) and pre- and post-processing TOC and thiosulfate ion analyses. The results are given in Table 1.

The evaluation criteria for the degree of odor generation are as follows:

A: No discomfort.

B: Slight discomfort.

C: Great discomfort.

In the above table, Sample Nos. 9 and 10 are based on the present invention.

the surface of the heater, resulting in distillate contamination and odor generation. This can be more effectively prevented as the temperature and pressure are decreased. Also, addition of a defoaming agent relating to the present invention is markedly effective in the prevention of such bubbling, making it possible to improve the degree of distillate clarification and processing efficiency.

Example 12

Using the distillates obtained in Sample Nos. 6 through 10, a color developer replenisher, fixer replenisher and stabilizer replenisher for the color negative film process CNK-4-52 were prepared and transferred to the replenisher tanks of an automatic processing machine CL-KP-50QA for color negative films, and running processing samples were conducted with exposed Konica Color Film Super DD-100. The running processing was continued until the color developer replenisher prepared with the distillate was supplied in an amount 2 times (2 rounds) the volume of tank solution.

At the top, 1.0 round and 2.0 rounds in the running test, Konica Control Strip CNK-4 was processed to evaluate the photographic processing performance.

TABLE 5

| Sample No. | Deforming agent | Evaporation temperature (°C.) | Evaporation pressure (mmHg) | Degree of odor | TOC (ppm) Before processing | TOC (ppm) After processing | $S_2O_3^{2-}$ (ppm) Before processing | $S_2O_3^{2-}$ (ppm) After processing | Processing power (liter/Hr) |
|---|---|---|---|---|---|---|---|---|---|
| 1 | Added | 100 | 700 | C | 8706 | 1008 | 35400 | 300 | 0.3 |
| 2 | Added | 100 | 200 | C | 8706 | 1120 | 35400 | 350 | 0.4 |
| 3 | Added | 45 | 720 | B | 8706 | 1060 | 35300 | 150 | 0.4 |
| 4 | Added | 45 | 200 | B | 8702 | 465 | 35280 | 150 | 0.8 |
| 5 | Added | 45 | 50 | B | 8710 | 250 | 35350 | 128 | 0.8 |
| 6 | Not added | 100 | 700 | A | 8710 | 360 | 35280 | 112 | 0.8 |
| 7 | Not added | 100 | 200 | A | 8708 | 245 | 35400 | 111 | 1.0 |
| 8 | Not added | 45 | 700 | A | 8708 | 225 | 35400 | 20 | 1.0 |
| 9 | Not added | 45 | 200 | A | 8710 | 65 | 35300 | 3 | 2.0 |
| 10 | Not added | 45 | 50 | A | 8710 | 63 | 35300 | 3 | 2.0 |

As seen in the data on the degree of odor generation and analytical values for the distillate components in Table 5 it is important to keep a relatively low temperature and a subnormal pressure, and processing performance increases as the temperature decreases and the pressure decreases.

In the evaporative concentrator used in the present invention, bubbling occurs upon contact of the waste liquid with The same distillate as used to dissolve the replenishers was used as a compensator for the evaporation loss in the processing tanks of the automatic processing machine every morning.

Table 6 shows the results for minimum and maximum densities.

TABLE 6

| Running test | Processing of check piece | Minimum Density B | Minimum Density G | Minimum Density R | Maximum Density B | Maximum Density G | Maximum Density R |
|---|---|---|---|---|---|---|---|
| (Sample-6) | TOP | 0.64 | 0.56 | 0.23 | 3.10 | 2.51 | 2.06 |
| Replenished with | 1. OR | 0.67 | 0.58 | 0.25 | 3.18 | 2.55 | 2.09 |
| Distillated water | 2. OR | 0.69 | 0.60 | 0.28 | 3.21 | 2.58 | 2.12 |
| (Sample-7) | TOP | 0.64 | 0.56 | 0.23 | 3.10 | 2.51 | 2.06 |
| Replenished with | 1. OR | 0.67 | 0.58 | 0.25 | 3.18 | 2.55 | 2.09 |
| Distillated water | 2. OR | 0.70 | 0.60 | 0.28 | 3.20 | 2.58 | 2.12 |
| (Sample-8) | TOP | 0.64 | 0.56 | 0.23 | 3.11 | 2.52 | 2.06 |
| Replenished with | 1. OR | 0.66 | 0.58 | 0.25 | 3.14 | 2.54 | 2.08 |
| Distillated water | 2. OR | 0.68 | 0.59 | 0.28 | 3.18 | 2.57 | 2.10 |
| (Sample-9) | TOP | 0.64 | 0.56 | 0.23 | 3.10 | 2.51 | 2.07 |
| Replenished with | 1. OR | 0.64 | 0.57 | 0.24 | 3.11 | 2.52 | 2.06 |
| Distillated water | 2. OR | 0.65 | 0.57 | 0.24 | 3.10 | 2.51 | 2.05 |
| (Sample-10) | TOP | 0.64 | 0.56 | 0.23 | 3.11 | 2.52 | 2.07 |
| Replenished with | 1. OR | 0.65 | 0.56 | 0.24 | 3.10 | 2.51 | 2.07 |
| Distillated water | 2. OR | 0.65 | 0.56 | 0.24 | 3.10 | 2.51 | 2.06 |

TABLE 6-continued

| Running test | Processing of check piece | Minimum Density | | | Maximum Density | | |
|---|---|---|---|---|---|---|---|
| | | B | G | R | B | G | R |
| (Comparative) Replenished with tap water | TOP | 0.64 | 0.56 | 0.23 | 3.11 | 2.52 | 2.07 |
| | 1. OR | 0.65 | 0.56 | 0.24 | 3.11 | 2.51 | 2.06 |
| | 2. OR | 0.65 | 0.57 | 0.24 | 3.10 | 2.51 | 2.05 |

As seen in Table 6, the running tests with the replenishers prepared in Sample Nos. 9 and 10 and comparative test with tap water gave very stable results, while the running tests with the replenishers prepared with the distillates obtained in sample Nos. 6 through 8 gave results showing gradually increase in developing activity. This phenomenon was found to be due to the thiosulfate ions in the distillates used to dissolve the replenishers. Specifically, because the distillates from Sample Nos. 6 through 8 in Example 11 contained large amounts of thiosulfate ions, the thiosulfate ion concentration increased as the replenisher was supplied to the color developer tank in the running test, which in turn promoted physical development. As to other properties, such as desilvering, color reproduction and film staining, no problems resulted from any running test.

These findings demonstrate that in recycling photographic processing waste liquid, the distillate can be used as a solvent for processing solution replenishers only when evaporative concentration has been conducted in the presence of a defoaming agent under a reduced pressure of not higher than 700 mmHg and a heating temperature of not higher than 90° C. as in the present invention.

Example 13

Using the distillates obtained in Sample Nos. 8 through 10 in Example 11, a color developer replenisher, bleach-fixer replenisher and stabilizer replenisher for the color printing paper process CPK-2-20 were prepared and transferred to the replenisher tanks of automatic processing machine CL-PP150 QA for color printing paper, and running processing samples were conducted with Konica Color QA Paper Type 5 set on a printer. The running processing was continued until the color developer replenisher prepared with the distillate was supplied in an amount 2 times (2 rounds) the volume of tank solution as in Example 12.

At the top, 1.0 round and 2.0 rounds in the running test, Konica Control Strip CPK-2 was processed to evaluate the photographic processing performance. The same distillate as used to dissolve the replenishers was used as a compensator for the evaporation loss in the processing tanks of the automatic processing machine every morning.

Table 7 shows the results for stain density in non-image portions and maximum density.

TABLE 7

| Running test | Processing of check piece | Stain Density | | | Maximum Density | | |
|---|---|---|---|---|---|---|---|
| | | B | G | R | B | G | R |
| (Sample-8) | TOP | 0.02 | 0.01 | 0.01 | 2.30 | 2.50 | 2.60 |
| Replenished with | 1. OR | 0.03 | 0.02 | 0.02 | 2.34 | 2.52 | 2.70 |
| Distillated water | 2. OR | 0.04 | 0.02 | 0.04 | 2.38 | 2.54 | 2.72 |
| (Sample-9) | TOP | 0.02 | 0.01 | 0.01 | 2.30 | 2.50 | 2.60 |
| Replenished with | 1. OR | 0.02 | 0.01 | 0.01 | 2.31 | 2.50 | 2.60 |
| Distillated water | 2. OR | 0.02 | 0.01 | 0.01 | 2.31 | 2.51 | 2.61 |
| (Sample-10) | TOP | 0.02 | 0.01 | 0.01 | 2.30 | 2.50 | 2.60 |
| Replenished with | 1. OR | 0.02 | 0.01 | 0.01 | 2.31 | 2.51 | 2.60 |
| Distillated water | 2. OR | 0.02 | 0.01 | 0.01 | 2.30 | 2.51 | 2.61 |
| (Comparative) | TOP | 0.02 | 0.01 | 0.01 | 2.30 | 2.51 | 2.61 |
| Replenished with | 1. OR | 0.02 | 0.01 | 0.01 | 2.31 | 2.51 | 2.60 |
| tap water | 2. OR | 0.02 | 0.01 | 0.01 | 2.31 | 2.51 | 2.61 |

As seen in Table 7, the running tests with the replenishers prepared in Sample Nos. 9 and 10 and comparative test with tap water gave very stable results, while the running test with the replenisher prepared with the distillate obtained in Sample No. 8 tended to show gradually increase in R density stain and maximum density.

These findings demonstrate that the constitution of the present invention is advantageous in reusing photographic processing waste liquid.

The method of the present invention makes it possible to recycle photographic processing waste liquid to eliminate its discharge into the environment. Specifically, photographic processing waste liquid can be efficiently evaporated and concentrated under reduced pressure without malodorous gas generation, and the resulting distillate can be used as a solvent for processing agents and as evaporation compensator for processing tanks of an automatic processing machine without affecting the photographic processing of the color light-sensitive material.

Example 14

1) Comparative

Using automatic processing machines CL-KP50QA for color negative films and CL-PP-1501QA for color printing paper, both produced by Konica Corporation, color negative film Super DD-100, after exposure for actual picture taking, and QA Paper Type A5, after actual printing, both produced by Konica Corporation, were processed with Konica Process CNK-4-52 and CPK-2-20 processing agents. All discharged waste liquids, combined together, were concentrated, using the reduced pressure evaporative concentrator illustrated in FIG. 1. In the processing with a defoaming agent, FS Antifoam 90, produced by Dow Corning K. K., was supplied by bellows pump 11 set to supply 1 g of the defoaming agent per liter of waste liquid.

The system was operated at a distilling temperature of 45° C. under a distilling pressure of 50 mmHg while supplying the waste liquid to the reduced pressure evaporative concentrator at a feed rate of 2.0 l/hr.

The color negative film processing solutions used for the processing had the following compositions:

Color Developer

Potassium carbonate 3.0 g

Sodium hydrogen carbonate 2.5 g

Potassium sulfite 3.0 g

Sodium bromide 1.3 g

Potassium iodide 1.2 mg

Hydroxylamine sulfate 2.5 g

Sodium chloride 0.6 g 4-amino-3-methyl-N-ethyl-N-(β-hydroxylethyl) aniline sulfate 4.5 g Diethylenetriaminepentaacetic acid 3.0 g Potassium hydroxide 1.2 g Water was added to 1 l, and potassium hydroxide or 20% sulfuric acid was added to obtain a pH of 10.06.

Color Developer Replenisher

Potassium carbonate 35 g

Sodium hydrogen carbonate 3 g

Potassium sulfite 5 g

Sodium bromide 0.5 g

Hydroxylamine sulfate 3.1 g 4-amino-3-methyl-N-ethyl-N-(β-hydroxylethyl) aniline sulfate 5.8 g Potassium hydroxide 2 g Diethylenetriaminepentaacetic acid 1.5 g Water was added to 1 l, and potassium hydroxide or 20% sulfuric acid was added to obtain a pH of 10.12.

Bleacher

Ammonium ferric 1,3-diaminopropanetetraacetate 140 g

Ammonium ethylenediaminetetraacetate 10 g

Ammonium bromide 150 g

Glacial acetic acid 40 ml

Water was added to 1 l, and aqueous ammonia or glacial acetic acid was added to obtain a pH of 4.2.

Bleacher Replenisher

Ammonium ferric 1,3-diaminopropanetetraacetate 160 g

Ammonium ethylenediaminetetraacetate 2 g

Ammonium bromide 178 g

Glacial acetic acid 50 ml

Sodium nitrate 30 g

Water was added to 1 l, and aqueous ammonia or glacial acetic acid was added to obtain a pH of 3.2.

Fixer

Ammonium thiosulfate 200 g

Anhydrous sodium bisulfite 12 g

Sodium metabisulfite 2.5 g

Disodium ethylenediaminetetraacetate 0.5 g

Water was added to 1 l, and aqueous ammonia or acetic acid was added to obtain a pH of 6.5.

Fixer replenisher

Ammonium thiosulfate 250 g

Anhydrous sodium bisulfite 15 g

Sodium metabisulfite 3 g

Disodium ethylenediaminetetraacetate 0.8 g

Water was added 1 l, and pH was adjusted to 6.5.

Stabilizer and Stabilizer Replenisher

Diethylene glycol 8.0 g

Metahydroxybenzaldehyde 2.0 g

Emulgen 810 1.0 ml

Emulgen 147 0.15 ml

Potassium hydroxide 0.2 g

Water was added to 1 l, and aqueous ammonia and 50% sulfuric acid were added to obtain a pH of 8.5.

The processing solutions for color printing paper (sample II) is shown.

Color Developer

Diethylene glycol 15.0 g

N,N-diethylhydroxylamine 3.6 g

Potassium bromide 20 mg

Potassium chloride 3.5 g

Diethylenetriaminepentaacetic acid 5 g

Potassium sulfite 0.2 g

Color developing agent (3-methyl-4-amino-N-ethyl-N-(βmethanesulfonamidoethyl)-aniline sulfate 5.5 g Potassium carbonate 25 g Potassium hydrogen carbonate 5 g Tinopal SFP (produced by Ciba-Geigy) 1.2 g Ubitex MST (produced by Ciba-Geigy) 1.5 g Water was added to 1 l, and potassium hydroxide or sulfuric acid was added to obtain a pH of 10.10.

Color Developer Replenisher

Diethylene glycol 15.0 g

Tinopal SFP (produced by Ciba-Geigy) 1.2 g

Ubitex MST (produced by Ciba-Geigy) 1.5 g

N,N-diethylhydroxylamine 5 g

Potassium chloride 0.3 g

Diethylenetriaminepentaacetic acid 7.5 g

Potassium sulfite $7.0 \times 10^{-4}$ mol

Color developing agent (3-methyl-4-amino-N-ethyl-N-(β-methanesulfonamidoethyl)-aniline sulfate 10 g Potassium carbonate 30 g Potassium hydrogen carbonate 1 g Water was added to 1 l, and potassium hydroxide or sulfuric acid was added to obtain a pH of 10.60.

Bleach-Fixer and Bleach-Fixer Replenisher

Ammonium ferric ethylenediaminetetraacetate 60 g

Ethylenediaminetetraacetic acid 2 g

Sodium sulfite 5 g

Ammonium thiosulfate 90 g

Sodium metabisulfite 10 g

Water was added to 1.0 l, and 25% aqueous ammonia or 90% acetic acid was added to obtain a pH of 5.40.

Stabilizer and Stabilizer Replenisher o-phenylphenol 0.1 g

Uvitex MST (produced by Ciba-Geigy) 0.5 g $ZnSO_4 \cdot 7H_2O$ 0.15 g

Ammonium sulfite (40% aqueous solution) 4.5 ml 1-hydroxyethylidene-1,1-diphosphonic acid (60% solution) 2.0 g Ethylenediaminetetraacetic acid 1.0 g Aqueous ammonia or sulfuric acid was added to obtain a pH of 7.5 and water was added to 1 l.

Running processing was continued until a total of 100 l of waste liquid was accumulated and not less than 80 l of distillate was obtained.

In the first cycle, the processing solutions were prepared with tap water. After the second cycle, the replenishers were prepared with the distillate described above. A total of 5 cycles were tested.

Each cycle lasted 5 days. In the first cycle, tap water was used to compensate the evaporation loss in the processing tanks of an automatic processing machine every morning. After the second cycle, the same distillate as used to prepare the replenishers was used.

2) Inventive Process 1

A total of 5 cycles were tested, using the distillate as a solvent for replenishers and as an evaporation compensator for the automatic processing machine after the second cycle, in the same manner as in Comparative Process, except that the color negative film color developer and color developer replenisher, and color printing paper color developer and color developer replenisher had the compositions shown below.

Color Developer

Sodium meta-borate 20.0 g

Potassium sulfite 3.0 g

Sodium bromide 1.3 g

Potassium iodide 1.2 mg

Hydroxylamine sulfate 2.5 g

Sodium chloride 0.6 g 4-amino-3-methyl-N-ethyl-N-(β-hydroxylethyl) aniline sulfate 4.5 g Diethylenetriaminepentaacetic acid 3.0 g Potassium hydroxide 1.2 g Water was added to 1 l, and potassium hydroxide or 20% sulfuric acid was added to obtain a pH of 10.06.

Color Developer Replenisher

Sodium meta-borate 2 hydrate 25 g

Potassium sulfite 5 g

Sodium bromide 0.5 g

Hydroxylamine sulfate 3.1 g 4-amino-3-methyl-N-ethyl-N-(β-hydroxylethyl) aniline sulfate 5.8 g Potassium hydroxide 2 g Diethylenetriaminepentaacetic acid 1.5 g Water was added to 1 l, and potassium hydroxide or 20% sulfuric acid was added to obtain a pH of 10.12. Composition for color paper.

Color Developer

Diethylene glycol 15.0 g

N,N-diethylhydroxylamine 3.6 g

Potassium bromide 20 mg

Potassium chloride 3.5 g

Diethylenetriaminepentaacetic acid 5 g

Potassium sulfite 0.2 g

Color developing agent (3-methyl-4-amino-N-ethyl-N-(β-methanesulfonamidoethyl)-aniline sulfate 5.5 g Potassium carbonate 25 g Potassium hydrogen carbonate 5 g Tinopal SFP (produced by Ciba-Geigy) 1.2 g Ubitex MST (produced by Ciba-Geigy) 1.5 g Water was added to 1 l, and potassium hydroxide or sulfuric acid was added to obtain a pH of 10.10.

Color Developer Replenisher

Diethylene glycol 15.0 g

Tinopal SFP (produced by Ciba-Geigy) 1.2 g

Ubitex MST (produced by Ciba-Geigy) 1.5 g

N,N-diethylhydroxylamine 5 g

Potassium chloride 0.3 g

Diethylenetriaminepentaacetic acid 7.5 g

Potassium sulfite $7.0 \times 10^{-4}$ mol

Color developing agent (3-methyl-4-amino-N-ethyl-N-(β-methanesulfonamidoethyl)-aniline sulfate 10 g Potassium carbonate 30 g Potassium hydrogen carbonate 1 g Water was added to 1 l, and potassium hydroxide or sulfuric acid was added to obtain a pH of 10.60.

3) Inventive Process 2

A total of 5 cycles were tested, using the distillate as a solvent for replenishers and as an evaporation compensator for the automatic processing machine after the second cycle, in the same manner as in Comparative Process, except that the color negative film bleacher, bleacher replenisher, fixer, fixer replenisher, and color printing paper bleach-fixer, bleach-fixer replenisher and stabilizer had the compositions shown below.

The color negative film processing solutions used had the following compositions:

Bleacher

Potassium ferric 1,3-diaminopropanetetraacetate 140 g

Sodium ethylenediaminetetraacetate 10 g

Potassium bromide 150 g

Glacial acetic acid 40 ml

Water was added to 1 l, and a 10% aqueous KOH solution or glacial acetic acid was added to obtain a pH of 4.2.

Bleacher Replenisher

Ammonium ferric 1,3-diaminopropanetetraacetate (ammonium salt or potassium salt) 160 g Ammonium ethylenediaminetetraacetate (sodium salt or ammonium salt) 2 g Potassium bromide 178 g Glacial acetic acid 50 ml Sodium nitrate 30 g Water was added to 1 l, the ratio of ammonium salt to the total cation content was adjusted as shown in Table 1, and pH was adjusted to 3.2.

Fixer

Potassium thiosulfate 200 g

Potassium thiocyanate 100 g

Anhydrous sodium bisulfite 12 g

Sodium metabisulfite 2.5 g

Disodium ethylenediaminetetraacetate 0.5 g

Water was added to 1 l, and aqueous ammonia or acetic acid was added to obtain a pH of 6.5.

Fixer Replenisher

Potassium thiosulfate 250 g

Potassium thiocyanate 150 g

Anhydrous sodium bisulfite 15 g

Sodium metabisulfite 3.0 g

Disodium ethylenediaminetetraacetate 0.8 g

Water was added to 1 l, and pH was adjusted to 6.5.

The color printing paper processing solutions used had the following compositions:

Bleach-Fixer and Bleach-Fixer Replenisher

Potassium ferric ethylenediaminetetraacetate 60 g

Ethylenediaminetetraacetic acid 2 g

Sodium sulfite 5 g
Ammonium thiosulfate 90 g
Sodium metabisulfite 10 g
Water was added to 1.0 l, and 10% potassium carbonate or acetic acid was added to obtain a pH of 5.4.

Stabilizer and stabilizer replenisher
o-phenylphenol 0.1 g
Ubitex MST (produced by Ciba-Geigy) 0.5 g
$ZnSO_4$ $7H_2O$ 0.15 g
Sodium sulfite 2.0 g
1-hydroxyethylidene-1,1-diphosphonic acid (60% aqueous solution) 2.0 g
Ethylenediaminetetraacetic acid 1.0 g
10% NaOH or sulfuric acid was added to obtain a pH of 7.5, and water was added to 1 l.

4) Inventive Process 3

A waste liquid discharged from the automatic processing machine in the same manner as in the comparative process was once retained in a plastic tank and adjusted by the addition of 20% sulfuric acid to obtain a pH value of 6.30 or 5.30 for the waste liquid to be supplied to the reduced pressure evaporative concentrator. Except for this treatment, the same procedure as the comparative process was followed. After the second cycle, the distillate was used as a solvent for replenishers and as an evaporation compensator for the automatic processing machine. A total of 5 cycles were tested.

5) Inventive Process 4

A waste liquid discharged from the reduced pressure evaporative concentrator in the same manner as in the comparative process was adjusted by the addition of 20% sulfuric acid to obtain a pH of 5.30, after which air was supplied for 30 minutes at a rate of 2.0 l/min, using a sprayer of the 5µ porous glass ball type. Except for this treatment, the same procedure as the comparative process was followed. After the second cycle, the distillate was used as a solvent for replenishers and as an evaporation compensator for the automatic processing machine. A total of 5 cycles were tested. Table 8 shows the analytical results for the compositions of the waste liquid and distillate by rounds obtained in the above five processes.

migrate into the distillate, provided that no ammonium ions are present.

In Inventive Process 3, migration of $CO_3^-$ ions into the distillate is suppressed by reducing the pH of the waste liquid below the neutral range. In particular, $CO_3^-$ ion migration into the waste liquid can be further suppressed by reducing the pH below 5.5.

In Inventive Process 4, $CO_3^-$ ions can be removed from the system as $CO_2$ by distillate pH adjustment and aeration, ensuring constant $CO_3^-$ ion concentration below a given level.

Example 15

At the top, first, second, third and fifth rounds in the running text in Example 14, photographic performance was evaluated with Konica Control Strip CNK-4 processed using an automatic processing machine for negative films and with Konica Control Strip CPK-2 processed using an automatic processing machine for printing paper.

Table 9 shows the results from the color negative film for minimum and maximum densities against a blue filter and the amount of residual silver in the maximum density portion.

Table 10 shows the results from the color printing paper for stain and maximum densities against a blue filter and the degree of fading of cyan dye density after 10 days of thermal drying at 60° C.

TABLE 8

| | | Minimum Density (Blue) | | | | Maximum Density (Blue) | | | | Residual amount of silver (mg/100 cm$^2$) | | | |
|---|---|---|---|---|---|---|---|---|---|---|---|---|---|
| | Processing | TOP | one cycle | 3 cycles | 5 cycles | TOP | one cycle | 3 cycles | 5 cycles | TOP | one cycle | 2 cycles | 3 cycles |
| (1) | Comparative | 0.64 | 0.65 | 0.68 | 0.75 | 3.10 | 3.18 | 3.25 | 3.30 | 0.26 | 0.42 | 1.10 | 2.00 |
| (2) | Inventive-1 | 0.64 | 0.65 | 0.65 | 0.65 | 3.10 | 3.12 | 3.12 | 3.12 | 0.26 | 0.26 | 0.28 | 0.27 |
| (3) | Inventive-2 | 0.64 | 0.65 | 0.64 | 0.65 | 3.10 | 3.12 | 3.12 | 3.11 | 0.27 | 0.26 | 0.28 | 0.27 |
| (4)-A | Inventive-3 | 0.64 | 0.65 | 0.65 | 0.65 | 3.10 | 3.12 | 3.13 | 3.13 | 0.27 | 0.26 | 0.28 | 0.27 |
| (4)-B | Inventive-3 | 0.64 | 0.65 | 0.66 | 0.65 | 3.10 | 3.12 | 3.12 | 3.13 | 0.28 | 0.27 | 0.28 | 0.28 |
| (5) | Inventive-4 | 0.64 | 0.65 | 0.66 | 0.66 | 3.10 | 3.12 | 3.12 | 3.14 | 0.27 | 0.27 | 0.28 | 0.28 |

As seen in Table 8, in the comparative process, pH tended to rise slightly for both the waste liquid and distillate as recycling was repeated, with a rapid rise in $CO_3^-$ ion concentration ($HCO_3^-$ ions included in $CO_3^-$ ion concentration). In contrast, in Inventive Process 1, only trace amounts of $CO_3^-$ and $HCO^{3-}$ ions were present in the waste liquid and distillate because they were removed previously.

In Inventive Process 2, ammonium ions were removed from the processing solutions. It is seen that even in the presence of $CO_3^-$ ions in the waste liquid, they do not

TABLE 9

| | Processing | Stain (Blue) | | | | Maximum Density (Blue) | | | | Cyan dye density after thermal drying storage | | | |
|---|---|---|---|---|---|---|---|---|---|---|---|---|---|
| | | TOP | one cycle | 3 cycles | 5 cycles | TOP | one cycle | 3 cycles | 5 cycles | TOP | one cycle | 3 cycles | 5 cycles |
| (1) | Comparative | 0.02 | 0.03 | 0.04 | 0.05 | 2.30 | 2.33 | 2.35 | 2.39 | 2.60 | 2.51 | 2.41 | 2.31 |
| (2) | Inventive-1 | 0.02 | 0.02 | 0.03 | 0.03 | 2.30 | 2.31 | 2.32 | 2.32 | 2.60 | 2.58 | 2.57 | 2.57 |
| (3) | Inventive-2 | 0.02 | 0.02 | 0.02 | 0.03 | 2.30 | 2.31 | 2.31 | 2.32 | 2.60 | 2.59 | 2.57 | 2.56 |
| (4)-A | Inventive-3 | 0.02 | 0.03 | 0.02 | 0.03 | 2.30 | 2.31 | 2.31 | 2.32 | 2.60 | 2.59 | 2.57 | 2.56 |
| (4)-B | Inventive-3 | 0.02 | 0.02 | 0.02 | 0.03 | 2.31 | 2.32 | 2.32 | 2.32 | 2.60 | 2.58 | 2.57 | 2.57 |
| (5) | Inventive-4 | 0.02 | 0.03 | 0.03 | 0.03 | 2.31 | 2.31 | 2.32 | 2.32 | 2.60 | 2.58 | 2.57 | 2.57 |

TABLE 10

| | | | pH | | | | | $CO_3$ conc. (ppm) | | | | |
|---|---|---|---|---|---|---|---|---|---|---|---|---|
| | | | one cycle | 2 cycles | 3 cycles | 4 cycles | 5 cycles | one cycle | 2 cycles | 3 cycles | 4 cycles | 5 cycles |
| (1) | Comparative | Waste | 7.28 | 7.30 | 7.37 | 7.42 | 7.51 | 5030 | 9760 | 13800 | 18700 | 23300 |
| | | Distillated | 8.25 | 8.45 | 8.12 | 8.77 | 8.92 | 4860 | 9720 | 13650 | 18600 | 23100 |
| (2) | Inventive-1 | Waste | 7.25 | 7.24 | 7.27 | 7.25 | 7.27 | 30 | 32 | 30 | 30 | 31 |
| | | Distillated | 8.10 | 8.11 | 8.15 | 8.14 | 8.12 | 20 | 21 | 19 | 18 | 18 |
| (3) | Inventive-2 | Waste | 7.24 | 7.21 | 7.23 | 7.20 | 7.22 | 5020 | 5080 | 5020 | 5150 | 5070 |
| | | Distillated | 7.04 | 7.03 | 7.05 | 7.01 | 7.06 | 30 | 32 | 31 | 32 | 30 |
| (4)-A | Inventive-3 | Waste | 6.30 | 6.30 | 6.30 | 6.30 | 6.30 | 5030 | 7200 | 7350 | 7410 | 7500 |
| | | Distillated | 5.86 | 5.81 | 5.76 | 5.81 | 5.84 | 3600 | 2700 | 3020 | 2950 | 3000 |
| (4)-B | Inventive-3 | Waste | 5.30 | 5.30 | 5.30 | 5.30 | 5.30 | 5050 | 5670 | 5980 | 5980 | 6030 |
| | | Distillated | 4.98 | 5.03 | 5.05 | 5.06 | 5.10 | 1460 | 1890 | 1520 | 1630 | 1680 |
| (5) | Inventive-4 | Waste | 7.27 | 7.31 | 7.34 | 7.32 | 7.35 | 5030 | 7890 | 8200 | 8200 | 8300 |
| | | Distillated | 5.30 | 5.30 | 5.30 | 5.30 | 5.30 | 3800 | 3920 | 4300 | 4300 | 4200 |

As seen in Table 9, the comparative process gave results undesirable for photographic processing performance, i.e., repeated reuse of the distillate resulted in increased minimum and maximum densities and increased residual silver (desilvering failure).

In contrast, Inventive Processes 1 through 4 gave almost constantly favorable results for photographic processing performance between the first and fifth rounds.

As seen in Table 10, the comparative process is faulty that repeated reuse of the distillate results in increased stain and maximum density and decreased cyan dye density during long-term storage of the processed print. In contrast, Inventive Processes 1 through 4 gave almost constantly favorable results for photographic processing performance between the first and fifth rounds.

The photographic processing wasteliquid recycling method of the present invention makes it possible to reuse photographic processing waste liquid without affecting photographic processing performance to eliminate its discharge into the environment.

Example 16

Using an automatic processing machine CL-PP150/QA, produced by Konica Corporation, color printing paper QA Paper Type A5 was subjected to running processing with Process CPK-2-20 processing agents (containing no benzyl alcohol), produced by Konica Corporation. All discharged waste liquids, combined together, were concentrated under the conditions shown in Table 11, using the reduced pressure evaporative concentrator illustrated in FIG. 1. The distillate thus obtained was named distillate A.

Next, distillates B, C and D were prepared in the same manner as with distillate A except that 2 ml, 5 ml or 10 ml of benzyl alcohol was added to 20P-1 (CPK-2-20 color printing paper color developer replenisher). Using each of these distillates to prepare 20P-1 (CPK-2-20 color printing paper developer replenisher), running processing was conducted until 100 liters of the replenisher prepared with the distillate was consumed. A color printing paper was subjected to an ordinary procedure of exposure through an optical wedge and then processed immediately before completion of the sample. The resulting sample was determined for the blue color density of reflected light in the unexposed portion ($D_{min}(B)$) and the blue color density of reflected light in the maximum exposure portion ($D_{max}(B)$).

The results are given in Table 11.

TABLE 11

| Sample No. | Evaporation temperature (°C.) | Evaporation pressure (mmHg) | Distillation water | Dmin (B) | Dmax (B) | Remarks |
|---|---|---|---|---|---|---|
| 1-1 | 100 | 760 | A | 1.71 | 0.21 | Comparative |
| 1-2 | 90 | 700 | A | 2.05 | 0.15 | Inventive |
| 1-3 | 90 | 500 | A | 2.15 | 0.13 | Inventive |
| 1-4 | 60 | 200 | A | 2.17 | 0.12 | Inventive |
| 1-5 | 40 | 55 | A | 2.16 | 0.12 | Inventive |
| 1-6 | 100 | 760 | B | 1.63 | 0.23 | Comparative |
| 1-7 | 90 | 700 | B | 2.03 | 0.16 | Inventive |
| 1-8 | 90 | 500 | B | 2.13 | 0.14 | Inventive |
| 1-9 | 60 | 200 | B | 2.14 | 0.13 | Inventive |
| 1-10 | 40 | 55 | B | 2.16 | 0.12 | Inventive |
| 1-11 | 100 | 760 | C | 1.60 | 0.25 | Comparative |
| 1-12 | 90 | 700 | C | 2.00 | 0.17 | Inventive |
| 1-13 | 90 | 500 | C | 2.08 | 0.14 | Inventive |
| 1-14 | 60 | 200 | C | 2.09 | 0.13 | Inventive |
| 1-15 | 40 | 55 | C | 2.08 | 0.12 | Inventive |
| 1-16 | 100 | 760 | D | 1.53 | 0.26 | Comparative |
| 1-17 | 90 | 700 | D | 1.55 | 0.25 | Comparative |
| 1-18 | 90 | 500 | D | 1.61 | 0.22 | Comparative |
| 1-19 | 60 | 200 | D | 1.63 | 0.21 | Comparative |
| 1-20 | 40 | 55 | D | 1.62 | 0.20 | Comparative |
| 1-21 | – | — | Tap water | 2.17 | 0.12 | Comparative |

As seen in Table 11, the present invention is favorable in that it results in no increased staining or reduced $D_{max}$.

From the viewpoint of the desired effect of the present invention, the benzyl alcohol content in the color developer is preferably not higher than 5 ml/l, more preferably not higher than 2 ml/l, and most preferably zero.

Table 11 also shows that a combination of 90° C. temperature and 500 mmHg distilling pressure is preferable, a combination of 60° C. temperature and 200 mmHg distilling pressure is more preferable, and a combination of 40° C. temperature and 55 mmHg distilling pressure is most preferable.

Waste liquids B and C were prepared in the same manner as with waste liquid A except that a Konica automatic processing machine CL-RD1700E, Konica Process CPK-1-10 processing agents (containing benzyl alcohol) and Konica color printing paper SR Paper were used for waste liquid B, and a Konica automatic processing machine CL-KP50QA, Konica Process CNK-4-40 processing agents (containing no benzyl alcohol) and a Konica color film Super DD-100 were used for waste liquid C. These waste liquids were combined as shown in Table 12 and treated to yield distillates in the same manner as in Example 16 and evaluated in the same manner as in Example 16.

The results are given in Table 12.

TABLE 12

| Sample No. | Waste | Evaporation temperature (°C.) | Evaporation pressure (mmHg) | Dmin (B) | Dmax (B) | Remarks |
|---|---|---|---|---|---|---|
| 2-1 | A | 100 | 760 | 0.21 | 1.71 | Comparative |
| 2-2 | A | 40 | 55 | 0.12 | 2.16 | Inventive |
| 2-3 | B | 100 | 760 | 0.27 | 1.58 | Comparative |
| 2-4 | B | 40 | 55 | 0.20 | 1.57 | Comparative |
| 2-5 | C | 100 | 760 | 0.22 | 1.70 | Comparative |
| 2-6 | C | 40 | 55 | 0.13 | 2.14 | Inventive |
| 2-7 | A + C | 100 | 760 | 0.25 | 1.65 | Comparative |
| 2-8 | A + C | 40 | 55 | 0.13 | 2.13 | Inventive |
| 2-9 | A + B | 100 | 760 | 0.31 | 1.53 | Comparative |
| 2-10 | A + B | 40 | 55 | 0.25 | 1.58 | Comparative |
| 2-11 | B + C | 100 | 760 | 0.32 | 1.50 | Comparative |
| 2-12 | B + C | 40 | 55 | 0.26 | 1.55 | Comparative |

Example 17

Using an automatic processing machine CL-PP150/QA, produced by Konica Corporation, color printing paper QA Paper Type A5, produced by Konica Corporation, was subjected to running processing with Process CPK-2-20 processing agents (containing no benzyl alcohol), produced by Konica Corporation. All discharged waste liquids were combined together to obtain waste liquid A.

As seen in Table 12, the effect of the present invention is enhanced when processing waste liquids from two or more kinds of automatic processing machines are combinedly subjected to evaporative concentration.

Example 18

Running processing samples were conducted in the same manner as in Example 16 except that the ammonia and ammonium salt in the tank solution and replenisher were partially or totally replaced with potassium hydroxide and potassium salt, respectively, so that the ammonium ion concentration in the combined waste liquid to be distilled would be about 3000, 2000, 1000, 500 and 0 ppm.

The results are given in Table 13.

together, were concentrated under the conditions shown in Table 14, using the reduced pressure evaporative concentrator illustrated in FIG. 1. The processing agents contained no acetic acid. Each of the distillates thus obtained was used as a solvent for P-2 and P-3 of Process CPK-2-28 and N-3 and N-4 of Process CNK-4-52 to prepare replenishers, and

TABLE 13

| Sample No. | Ammonium concentration (Measured) (ppm) | Benzyl alcohol detected | Evaporation temperature (°C.) | Evaporation pressure (mmHg) | Dmin (B) | Dmax (B) | Remarks |
|---|---|---|---|---|---|---|---|
| 3-1 | 3060 | None | 100 | 760 | 0.24 | 1.71 | Comparative |
| 3-2 | 3060 | None | 40 | 55 | 0.13 | 2.15 | Inventive |
| 3-3 | 2040 | None | 100 | 760 | 0.23 | 1.73 | Comparative |
| 3-4 | 2040 | None | 40 | 55 | 0.12 | 2.18 | Inventive |
| 3-5 | 1010 | None | 100 | 760 | 0.21 | 1.74 | Comparative |
| 3-6 | 1010 | None | 40 | 55 | 0.10 | 2.19 | Inventive |
| 3-7 | 470 | None | 100 | 760 | 0.21 | 1.74 | Comparative |
| 3-8 | 470 | None | 40 | 55 | 0.09 | 2.21 | Inventive |
| 3-9 | 0 | None | 100 | 760 | 0.21 | 1.75 | Comparative |
| 3-10 | 0 | None | 40 | 55 | 0.08 | 2.20 | Inventive |

As seen in Table 13, the effect of the present invention is enhanced when the ammonium ion concentration is not higher than 2000 ppm, particularly not higher than 1000 ppm.

According to the present invention, the distillate resulting from evaporative concentration of photographic processing waste liquid can be reused as a solvent for processing agents and as an evaporation compensator, and the volume of waste liquid can be substantially reduced without malodor generation. In addition, the processing solutions prepared with the recycled distillate offer good photographic processing performance free of maximum density reduction and staining.

Example 19

Using automatic processing machines CL-KP32QA and PP-801SQA, both produced by Konica Corporation, a Konica color negative film Super DD-100, after exposure, running processing was continued until at least 100 liters of the replenisher was consumed.

After completion of the sample, a color film DD-100, subjected to a conventional procedure of exposure through an optical wedge, and a color printing paper QA Paper Type A5, were processed and then stored at 65° C. and 50% RH for 2 weeks, after which the blue density difference was determined from the value obtained immediately after the processing.

The results are given in Table 14.

TABLE 14

| Sample No. | Evaporation temperature (°C.) | Evaporation pressure (mmHg) | Acid 5.0 g in 1 l waste | Image storability at 65° C., 50% RH | | | | Remarks |
| | | | | Color film | | Color paper | | |
| | | | | Dmin (Blue) | Dmax (Blue) | Dmin (Blue) | Dmax (Blue) | |
|---|---|---|---|---|---|---|---|---|
| 1-1 | 100 | 760 | — | +0.13 | −0.25 | +0.05 | −0.15 | Comparative |
| 1-2 | 100 | 760 | Acetic acid | +0.14 | −0.27 | +0.06 | −0.16 | Comparative |
| 1-3 | 100 | 760 | Maleic acid | +0.13 | −0.24 | +0.06 | −0.15 | Comparative |
| 1-4 | 90 | 700 | — | +0.09 | −0.13 | +0.03 | −0.07 | Inventive |
| 1-5 | 60 | 200 | — | +0.07 | −0.11 | +0.02 | −0.06 | Inventive |
| 1-6 | 40 | 55 | — | +0.05 | −0.09 | +0.01 | −0.05 | Inventive |
| 1-7 | 40 | 55 | Acetic acid | +0.11 | −0.19 | +0.05 | −0.12 | Comparative |
| 1-8 | 40 | 55 | Succinic acid | +0.05 | −0.09 | +0.01 | −0.05 | Inventive |
| 1-9 | 40 | 55 | Glycolic acid | +0.07 | −0.12 | +0.02 | −0.07 | Inventive |
| 1-10 | 40 | 55 | Glycine | +0.07 | −0.12 | +0.02 | −0.07 | Inventive |
| 1-11 | 40 | 55 | Benzoic acid | +0.07 | −0.12 | +0.03 | −0.07 | Inventive |
| 1-12 | 40 | 55 | Ascorbic acid | +0.06 | −0.11 | +0.02 | −0.06 | Inventive |
| 1-13 | 40 | 55 | Phthatic acid | +0.06 | −0.11 | +0.02 | −0.06 | Inventive |
| 1-14 | 40 | 55 | Maleic acid | +0.05 | −0.09 | +0.01 | −0.05 | Inventive | and a Konica color printing paper QA Paper Type A-5, were processed with Konica Process CNK-4-52 and Process CPK-2-28 processing agents, in accordance with the instruction manual. All discharged waste liquids, combined As seen in Table 14, the present invention offers good image storage stability, while the presence of acetic acid in the waste liquid results in deteriorated image storage stability. Also, image storage stability varies depending on distilling temperature and pressure; within the range of the present invention, image storage stability improves slightly. In addition, the effect of the present invention is particularly enhanced when acetic acid is replaced with a dibasic acid such as maleic acid or succinic acid.

Example 20

The same processing and evaluation procedures as in Example 19 were followed except that the ammonia concentration in the waste liquid was kept in the range shown in Table 15 for sample Nos. 1-1, 1-6, 1-7 and 1-14, and that the waste liquid was used as a color printing paper color developer replenisher and color negative film color developer replenisher. $D_{max}$ for blue light after processing was also determined as a representative parameter for developability. In changing the ammonia concentration, the ammonia and ammonium salt were partially or totally replaced with potassium salt.

The results are given in Tables 15 and 16.

waste liquid to be processed can be substantially reduced or made zero without malodor generation.

Example 21

Using automatic processing machines CL-KP32QA and PP-801SQA, both produced by Konica Corporation, a Konica color negative film Super DD-100, after exposure, and a color negative film SHG100, produced by Fuji Photo Film Co., Ltd., after exposure, mixed in a 3:7 ratio, were processed with Konica Process CNK-4-52 and Process CPK-2-28 processing agents, in accordance with the respective instruction manuals. All discharged waste liquids from CL-KP32QA and PP-801SQA were combined together, and each of the acids listed in Table 17 was added, followed by pH adjustment and subsequent treatment using the reduced pressure evaporative concentrator illustrated in FIG. 3. The distillate thus obtained was used as a solvent for bleach-fixer replenisher (P-2) and stabilizer replenisher (P-3) of Process CPK-2-28 and fixer replenisher (N-3) and stabilizer replen-

TABLE 15

| Sample No. | Evaporation temperature (°C.) | Evaporation pressure (mmHg) | Acid 5.0 g in 1 l waste | Ammonium Concentration (ppm)/waste 1 l | Image storability at 65° C., 50% RH | | | | Remarks |
|---|---|---|---|---|---|---|---|---|---|
| | | | | | Color film | | Color paper | | |
| | | | | | Dmin (Blue) | Dmax (Blue) | Dmin (Blue) | Dmax (Blue) | |
| 2-1 | 100 | 760 | — | 4000 | +0.15 | −0.27 | +0.08 | −0.18 | Comparative |
| 2-2 | 40 | 55 | — | 4000 | +0.06 | −0.10 | +0.03 | −0.08 | Inventive |
| 2-3 | 40 | 55 | — | 2000 | +0.05 | −0.07 | +0.02 | −0.06 | Inventive |
| 2-4 | 40 | 55 | — | 500 | +0.04 | −0.05 | +0.01 | −0.05 | Inventive |
| 2-5 | 40 | 55 | Acetic acid | 500 | +0.13 | −0.21 | +0.06 | −0.14 | Comparative |
| 2-6 | 40 | 55 | Maleic acid | 500 | +0.04 | −0.05 | +0.01 | −0.05 | Inventive |

TABLE 16

| Sample No. | Evaporation temperature (°C.) | Evaporation pressure (mmHg) | Acid 5.0 g in 1 l waste | Ammonium Concentration (ppm)/waste 1 l | Developability | | Remarks |
|---|---|---|---|---|---|---|---|
| | | | | | Color film Dmax (Blue) | Color paper Dmax (Blue) | |
| 2-1 | 100 | 760 | — | 4000 | 2.53 | 1.82 | Comparative |
| 2-2 | 40 | 55 | — | 4000 | 2.72 | 1.99 | Inventive |
| 2-3 | 40 | 55 | — | 2000 | 2.91 | 2.11 | Inventive |
| 2-4 | 40 | 55 | — | 500 | 3.06 | 2.28 | Inventive |
| 2-5 | 40 | 55 | Acetic acid | 500 | 2.95 | 2.16 | Comparative |
| 2-6 | 40 | 55 | Maleic acid | 500 | 3.05 | 2.28 | Inventive |

As seen in Tables 15 and 16, the presence of high concentrations of ammonium ions in the waste liquid significantly affects the developability, resulting in a decreasing tendency. It is also seen that when the waste liquid is used as a solvent for the developer, good results are obtained in the absence of acetic acid at ammonium ion concentrations of not higher than 2000 ppm.

According to the present invention, the distillate resulting from evaporative concentration of photographic processing waste liquid can be reused as a solvent for processing agents and as an evaporation compensator without affecting the photographic processing performance, and the volume of isher (N-4) of Process CNK-4-52. Running processing was continued until 100 liters of the bleach-fixer replenisher was consumed.

After completion of the running processing, a color film DD-100, subjected to a conventional procedure of exposure through an optical wedge, and a color printing paper Konica QA Paper Type A5, were processed, after which the resulting sample was stored at 80° C. and 50% RH for 1 week during which the changes in image storage stability were monitored at a density of minimum density for blue color +1.0.

The results are given in Table 17.

TABLE 17

| | Sample No. | Evaporation temperature (°C.) | Evaporation pressure (mmHg) | Acid | pH in tank for waste | Image storability at 85° C., 50% RH | |
|---|---|---|---|---|---|---|---|
| | | | | | | Color film $D_{1.0}$ Blue density | Color paper $D_{1.0}$ Blue density |
| Comparative | 1-1 | 100 | 760 | — | 7.0 | −0.13 | −0.11 |
| Comparative | 1-2 | 100 | 760 | Sulfuric acid | 7.0 | −0.13 | −0.11 |
| Comparative | 1-3 | 100 | 760 | Sulfuric acid | 5.0 | −0.10 | −0.09 |
| Inventive | 1-4 | 90 | 700 | Sulfuric acid | 5.0 | −0.05 | −0.05 |
| Inventive | 1-5 | 60 | 200 | Sulfuric acid | 5.0 | −0.04 | −0.03 |
| Inventive | i-6 | 40 | 55 | Sulfuric acid | 5.0 | −0.03 | −0.02 |
| Inventive | 1-7 | 40 | 55 | Sulfuric acid | 4.0 | −0.02 | −0.02 |
| Inventive | 1-8 | 40 | 55 | Sulfuric acid | 6.5 | −0.05 | −0.04 |
| Comparative | 1-9 | 40 | 55 | — | 8.0 | −0.09 | −0.07 |
| Inventive | 1-10 | 40 | 55 | Maleic acid | 5.0 | −0.03 | −0.02 |
| Inventive | 1-11 | 40 | 55 | Citric acid | 5.0 | −0.03 | −0.02 |
| Inventive | 1-12 | 40 | 55 | Succinic acid | 5.0 | −0.03 | −0.02 |
| Inventive | 1-13 | 40 | 55 | Hydrochloric acid | 5.0 | −0.03 | −0.02 |
| Inventive | 1-14 | 40 | 55 | Para-toluensulfonic acid | 5.0 | −0.04 | −0.02 |
| Inventive | 1-15 | 40 | 55 | Phthalic acid | 5.0 | −0.04 | −0.02 |

As seen in Table 17, the present invention offers good image storage stability, and this effect is particularly enhanced by reducing the waste liquid tank pH below 6.5. It is also seen that when the distilling temperature and pressure were out of the range of the present invention, the desired effect of the present invention cannot be obtained even at pH values of not higher than 6.5.

Example 22

The same processing and evaluation procedures as in Example 21 were followed except that an acid was added not to the waste liquid tank but to the waste liquid chamber to obtain the pH of Example 21. Although a similar tendency was noted, the effect obtained was lower than that obtained in Example 21.

Example 23

The same processing and evaluation procedures as in Example 21 were followed except that an acid was added not to the waste liquid tank but to the distillate to make the waste liquid tank pH equal to the distillate pH as shown in Table 17. Although almost similar results were obtained, the effect obtained was intermediate between Examples 21 and 22.

Air bubbling offered an effect comparable to that obtained in Example 21.

Example 24

The same processing and evaluation procedures as in Example 21 were followed except that the ammonia concentration in the waste liquid was changed over the range shown in Table 18 as to Sample Nos. 1-1, 1-3, 1-6 and 1-10.

In changing the ammonia concentration, the ammonia and ammonium salt were partially or totally replaced with potassium salt.

The results are given in Table 18.

TABLE 18

| | Sample No. | Evaporation temperature (°C.) | Evaporation pressure (mmHg) | Acid | pH in tank for waste | Ammonium concentration (ppm)/Waste (l) | Image storability at 85° C., 50% RH | |
|---|---|---|---|---|---|---|---|---|
| | | | | | | | Color film $D_{1.0}$ Blue | Color paper $D_{1.0}$ Blue |
| Comparative | 2-1 | 100 | 760 | — | 7.0 | 4000 | −0.14 | −0.12 |
| Comparative | 2-2 | 100 | 760 | Sulfuric acid | 5.0 | 4000 | −0.11 | −0.10 |
| Comparative | 2-3 | 100 | 760 | Sulfuric acid | 5.0 | 2000 | −0.10 | −0.10 |
| Comparative | 2-4 | 100 | 760 | Sulfuric acid | 5.0 | 500 | −0.09 | −0.09 |
| Inventive | 2-5 | 40 | 55 | Sulfuric acid | 5.0 | 4000 | −0.07 | −0.06 |
| Inventive | 2-6 | 40 | 55 | Sulfuric acid | 5.0 | 500 | −0.02 | −0.02 |
| Inventive | 2-7 | 40 | 55 | Maleic acid | 5.0 | 500 | −0.02 | −0.02 |

As seen in Table 18, image storage stability is markedly improved by reducing the ammonium ion concentration in the waste liquid.

According to the present invention, the distillate resulting from evaporative concentration can be used as a solvent for processing agents and an evaporation compensator without affecting the photographic processing performance, and the volume of waste liquid to be treated can be substantially reduced or made zero without malodor generation. In addition, image storage stability could be improved by reducing the ammonium ion concentration in the waste liquid.

Example 25

Preparation of Color Printing Paper Sample

Layers with the compositions shown in Tables 19 and 20 were coated on a paper support, laminated with polyethylene on one face and titanium-oxide-containing polyethylene on the other face, to yield a multiple-layered color light-sensitive material. The coating solutions were prepared as follows.

Coating Solution for First Layer 26.7 g of a yellow coupler PY-1, 10.0 g of a dye image stabilizer ST-1, 6.67 g of another dye image stabilizer ST-2, 0.67 g of an additive HQ-1 and 6.5 g of a high boiling organic solvent DNP were dissolved in 60 ml of ethyl acetate. This solution was emulsified and dispersed in 220 ml of a 10% aqueous solution of gelatin containing 7 ml of 20% surfactant SU-1 using an ultrasonic homogenizer to yield a yellow coupler dispersion. This dispersion was mixed with a blue-sensitive silver halide emulsion (contain- ing 10 g of silver) prepared under the following conditions to yield a coating solution for first layer.

Coating solutions for the second through seventh layer were prepared in the same manner as with the coating solution for first layer.

Hardeners H-1 and H-2 were added to layers 2 and 4 and layer 7, respectively. Surfactants SU-2 and SU-3, as coating aids, were added to adjust surface tension.

| Layer | Composition | Amount added (g/m$^2$) |
|---|---|---|
| 7th layer (Protective layer) | Gelatin | 0.9 |
| | Antimold(F-1) | 0.002 |
| 6th layer (UV absorbing layer) | Gelatin | 0.35 |
| | UV absorbent (UV-1) | 0.10 |
| | UV absorbent (UV-2) | 0.04 |
| | UV absorbent (UV-3) | 0.16 |
| | Antistaining agent (HQ-1) | 0.01 |
| | DNP | 0.20 |
| | PVP | 0.03 |
| | Anti-irradiation dye (AI-2) | 0.02 |
| 5th layer (Res-sensitive layer) | Gelatin | 1.20 |
| | Red-sensitive silver chlorobromide emulsion (Em-R), Amount converted in silver | 0.18 |
| | Cyan coupler (PC-1) | 0.30 |
| | Dye-image stabilizer (ST-1) | 0.20 |
| | Antistaining agent (HQ-1) | 0.01 |
| | HBS-1 | 0.20 |
| | DOP | 0.25 |
| 4th layer (UV absorbing layer) | Gelatin | 1.00 |
| | UV absorbent (UV-1) | 0.28 |
| | UV absorbent (UV-2) | 0.09 |
| | UV absorbent (UV-3) | 0.38 |
| | Antistaining agent (HQ-1) | 0.03 |
| | DNP | 0.35 |
| 3rd layer (Green-sensitive layer) | Gelatin | 1.30 |
| | Green-sensitive silver chlorobromide emulsion (Em-G), Amount converted in silver | 0.15 |
| | Magenta coupler (M-25) | 0.30 |
| | Dye-image stabilizer (ST-3) | 0.15 |
| | Dye-image stabilizer (ST-4) | 0.20 |
| | Dye-image stabilizer (ST-5) | 0.15 |
| | DNP | 0.20 |
| | Anti-irradiation dye (AI-1) | 0.01 |
| 2nd layer (Interlayer) | Gelatin | 1.20 |
| | Antistaining agent (HQ-2) | 0.12 |
| | DIDP | 0.15 |
| | Antimold (F-1) | 0.002 |
| 1st layer (Blue-sensitive layer) | Gelatin | 1.20 |
| | Blue-sensitive silver chlorobromide emulsion (Em-B), Amount converted in silver | 0.25 |
| | Yellow coupler (PY-1) | 0.80 |
| | Dye-image stabilizer (ST-1) | 0.30 |
| | Dye-image stabilizer (ST-2) | 0.20 |
| | Antistaining agent (HQ-1) | 0.02 |
| | Anti-irradiation dye (AI-3) | 0.01 |
| | DNP | 0.19 |
| Support | Polyethylene-laminated paper sheet | |

Preparation of Blue-Sensitive Silver Halide Emulsion

To 1000 ml of a 2% aqueous solution of gelatin incubated at 40° C. the following Components A and B were simultaneously added in 30 minutes while maintaining a pAg of 6.5 and a pH of 3.0, after which the following Components C and D were simultaneously added in 180 minutes while maintaining a pAg of 7.3 and a pH of 5.5.

pAg was regulated by the method described in Japanese Patent O.P.I. Publication No. 45437/1984. pH was regulated using an aqueous solution of sulfuric acid or sodium hydroxide.

Component A
Sodium chloride 3.42 g
Potassium bromide 0.03 g
Water was added to 200 ml.
Component B
Silver nitrate 10 g
Water was added to 200 ml.
Component C
Sodium chloride 102.7 g
Potassium bromide 1.0 g
Water was added to 600 ml.
Component D
Silver nitrate 300 g
Water was added to 600 ml.

After completion of the addition, the mixture was desalinized using a 5% aqueous solution of Demol N, a product of Kao Atlas, and a 20% aqueous solution of magnesium sulfate and then mixed with an aqueous solution of gelatin to yield a monodispersed emulsion EMP-1 comprising cubic grains having an average grain size of 0.85 μm, a coefficient of variation of 0.07 and a silver chloride content of 99.5 mol %.

Coefficient of variation = standard deviation of grain size distribution/average grain size.

The resulting emulsion EMP-1 was chemically ripened with the following compounds at 50° C. for 90 minutes to yield a blue-sensitive silver halide emulsion Em-B.

Sodium thiosulfate 0.8 mg/mol AgX
Chloroauric acid 0.5 mg/mol AgX
Stabilizer STAB-1 6×10⁻⁴ mol/mol AgX
Sensitizing dye BS-1 4×10⁻⁴ mol/mol AgX
Sensitizing dye BS-2 1×10⁻⁴ mol/mol AgX Preparation of Green-Sensitive Silver Halide Emulsion A monodispersed emulsion EMP-2 comprising cubic grains having an average grain size of 0.43 μm, a coefficient of variation of 0.08 and a silver chloride content of 99.5 mol % was prepared in the same manner as with EMP-1 except that the addition time for Components A and B and the addition time for Components C and D were changed.

The resulting emulsion EMP-2 was chemically ripened with the following compounds at 55° C. for 120 minutes to yield a green-sensitive silver halide emulsion Em-G.

Sodium thiosulfate 1.5 mg/mol AgX
Chloroauric acid 1.0 mg/mol AgX
Stabilizer STAB-1 6×10⁻⁴ mol/mol AgX
Sensitizing dye GS-1 4×10⁻⁴ mol/mol AgX Preparation of Red-Sensitive Silver Halide Emulsion A monodispersed emulsion EMP-3 comprising cubic grains having an average grain size of 0.50 μm, a coefficient of variation of 0.08 and a silver chloride content of 99.5 mol % was prepared in the same manner as with EMP-1 except that the addition time for Components A and B and the addition time for Components C and D were changed.

The resulting emulsion EMP-3 was chemically ripened with the following compounds at 60° C. for 90 minutes to yield a red-sensitive silver halide emulsion Em-R.

Sodium thiosulfate 1.8 mg/mol AgX
Chloroauric acid 2.0 mg/mol AgX
Stabilizer STAB-1 6×10⁻⁴ mol/mol AgX
Sensitizing dye RS-1 1×10⁻⁴ mol/mol AgX

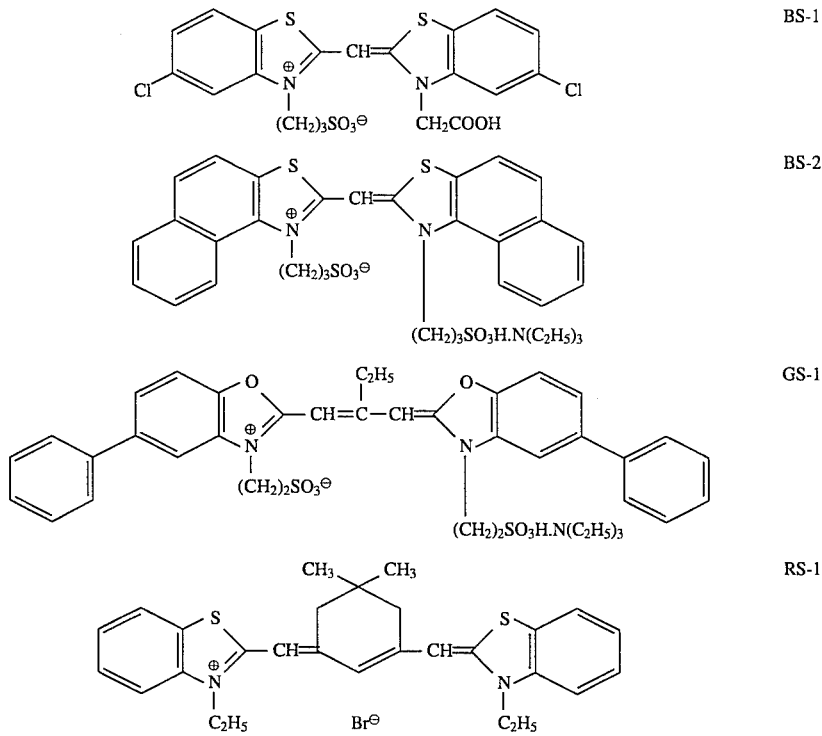

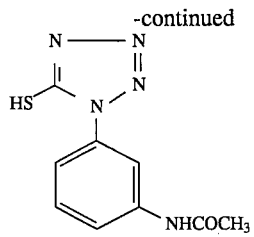

STAB-1

Preparation of Color Negative Samples

In the following examples, the amount of additive is shown in terms of $g/m^2$ other than the case specified contrarily. The amounts of silver halide and colloidal silver are shown in terms of converted amount of silver. The amount of sensitizing dye is shown in terms of mol per 1 mol of silverhalide.

Each layer composed of the following formulae were coated on a triacetyl cellurose film support in this order to prepare a multi layer color light sensitive material samples.

First layer: Anti hallation layer (HC)
  Black colloid silver 0.11
  UV absorber (UV-11) 0.18
  Colored cyan coupler (CC-1) 0.02
  High boiling solvent (Oil-1) 0.18
  Gelatin 1.50
Second layer: Inter layer (IL-1)
  Gelatin 1.20
Third layer: Low speed red sensitive emulsion layer (RL)
  Iodobromide emulsion (Silver iodide 3 mol %) 0.75
  Sensitizing dye (S-1) $3.2 \times 10^{-4}$
  Sensitizing dye (S-2) $3.2 \times 10^{-4}$
  Sensitizing dye (S-3) $0.2 \times 10^{-4}$
  Cyan coupler (NC-1) $1.13 \times 10^{-4}$ $mol/m^2$
  Colored cyan coupler(CC-1) 0.07
  DIR compound (D-1) 0.001
  DIR compound (D-2) 0.01
  High boiling solvent (Oil-1) 0.50
  Gelatin 1.00
Fourth Layer: High speed Red Sensitive Emulsion Layer (RH)
  Iodobromide emulsion (Silver iodide 7 mol %) 0.75
  Sensitizing dye (S-1) $1.5 \times 10^{-4}$
  Sensitizing dye (S-2) $1.6 \times 10^{-4}$
  Sensitizing dye (S-3) $0.1 \times 10^{-4}$
  Cyan coupler (NC-1) $4.53 \times 10^{-4}$ $mol/m^2$
  Colored cyan coupler (CC-1) 0.03
  DIR compound (D-2) 0.02
  High boiling solvent (Oil-1) 0.24
  Gelatin 1.00
Fifth Layer: Inter Layer (IL-2)
  Gelatin 1.20
Sixth Layer: Low Speed Green Sensitive Emulsion Layer (GL)
  Iodobromide emulsion (Silver iodide 4 mol %) 0.90
  Sensitizing dye (S-4) $7.0 \times 10^{-4}$
  Sensitizing dye (S-5) $0.8 \times 10^{-4}$
  Magenta coupler (NM-1) $6.68 \times 10^{-4}$ $mol/m^2$
  Colored magenta coupler (CM-1) 0.10
  DIR compound (D-3) 0.02
  High boiling solvent (Oil-2) 0.58
  Gelatin 1.10
Seventh Layer: High Speed Green Sensitive Emulsion Layer (GH)
  Iodobromide emulsion (Silver iodide 8 mol %) 0.80
  Sensitizing dye (S-6) $1.1 \times 10^{-4}$
  Sensitizing dye (S-7) $2.0 \times 10^{-4}$
  Sensitizing dye (S-8) $0.3 \times 10^{-4}$
  Magenta coupler (NM-1) $1.42 \times 10^{-4}$ $mol/m^2$
  Colored magenta coupler (CM-1) 0.04
  DIR compound (D-3) 0.006
  High boiling solvent (Oil-2) 0.35
  Gelatin 0.90
Eighth Layer: Yellow Filter Layer (YC)
  Yellow colloid silver 0.10
  Additive (HS-1) 0.07
  Additive (HS-2) 0.07
  Additive (SC-1) 0.12
  High boiling solvent (Oil-2) 0.15
  Gellatin 1.00
Nineth Layer: Low Speed Blue Sensitive Emulsion Layer (BL)
  Iodobromide emulsion (Silver iodide 6 mol %) 0.50
  Sensitizing dye (S-9) $5.8 \times 10^{-4}$
  Yellow coupler (NY-1) $2.24 \times 10^{-4}$ $mol/m^2$
  DIR compound (D-1) 0.003
  DIR compound (D-2) 0.006
  High boiling solvent (Oil-2) 0.18
  Gelatin 1.20
Tenth Layer: High Speed Blue Sensitive Emulsion Layer (BH)
  Iodobromide emulsion (Silver iodide 12 mol %) 0.50
  Sensitizing dye (S-10) $3.0 \times 10^{-4}$
  Sensitizing dye (S-11) $1.2 \times 10^{-4}$
  Yellow coupler (NY-1) $5.02 \times 10^{-4}$ $mol/m^2$
  High boiling solvent (Oil-2) 0.05
  Gelatin 1.00
Eleventh Layer: First Protective Layer (PRO-1)
  Iodobromide emulsion (fine grains) 0.30
  UV absorber (UV-11) 0.07
  UV absorber (UV-12) 0.10
  Additive (HS-1) 0.20
  Additive (HS-2) 0.10
  High boiling solvent (Oil-1) 0.07
  High boiling solvent (Oil-3) 0.07
  Gelatin 0.80
Twelveth Layer: Second Protective Layer (PRO-2)
  Matting agent soluble in alkali (average particlce size: 2 μm) 0.13
  Plymethyl metacrylate (average particlce size: 3 μm) 0.02
  Gelatin 0.50

In each layer a coating aid SU-4, a dispersant SU-1, ahardening agent H-2 or H-3 and a dye AI-11 or AI-12 is optionally added in addition to the above.
Emulsions used in the samples are those having mododispersed grain distribution emulsion.
NC-1
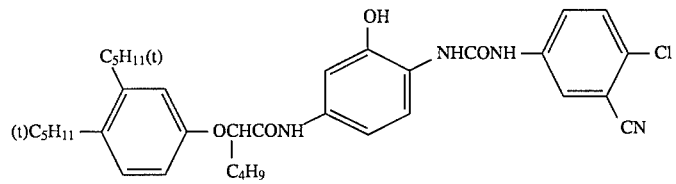
NM-1
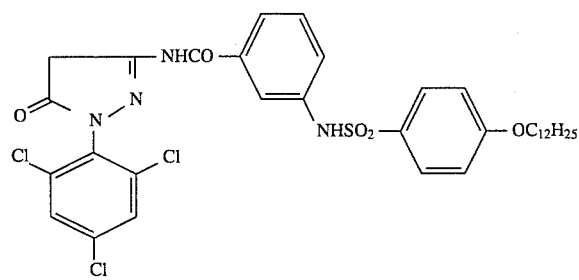
NY-1
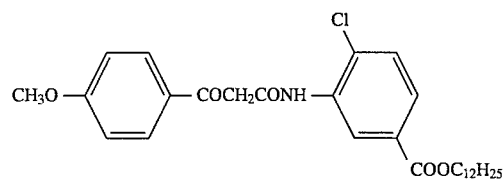
CC-1
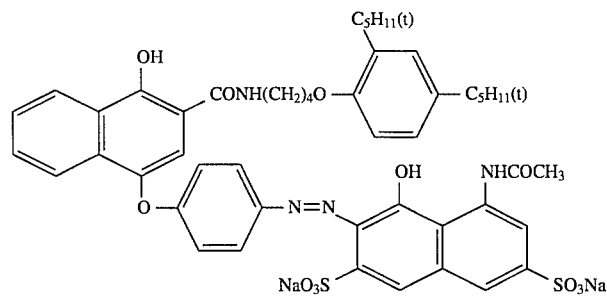
CM-1
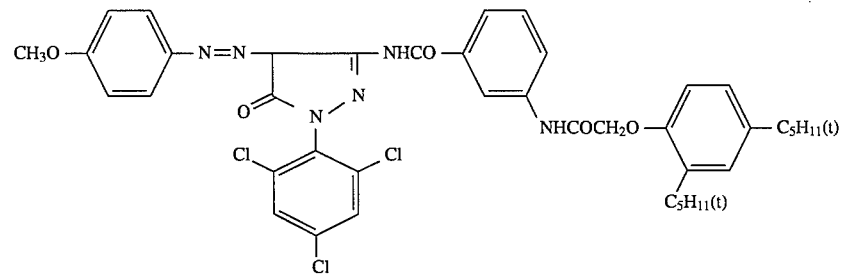
D-1
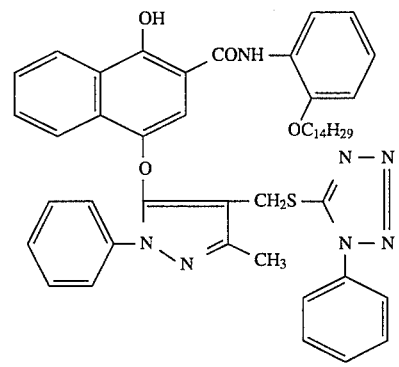

-continued
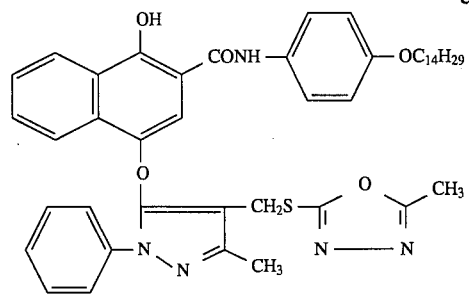
D-2
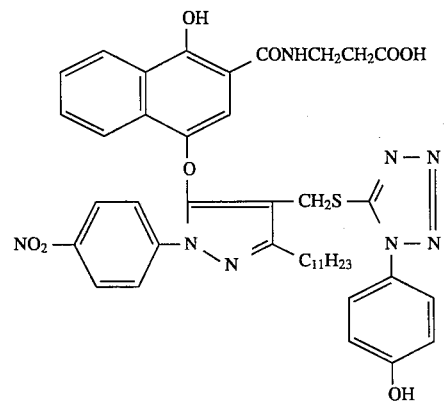
D-3
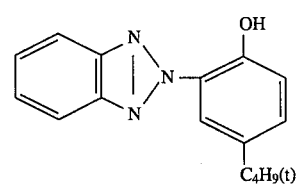
UV-11
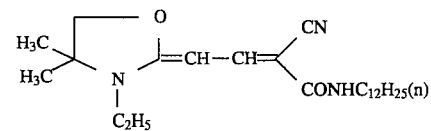
UV-12
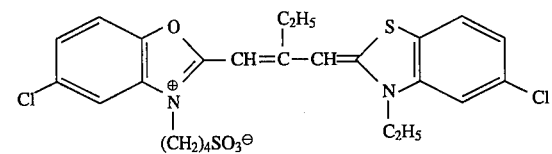
S-1
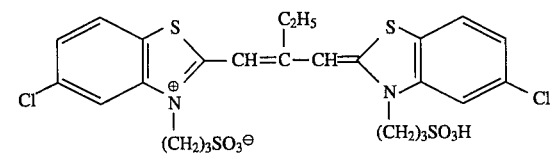
S-2
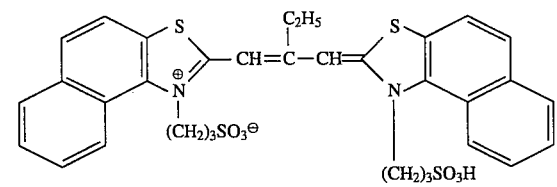
S-3
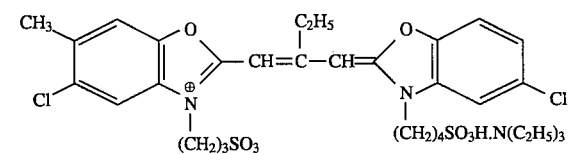
S-4

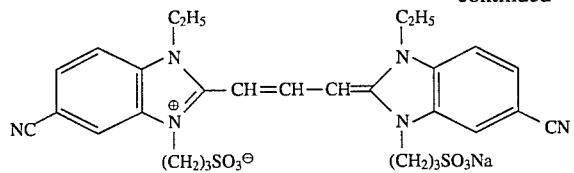 S-5
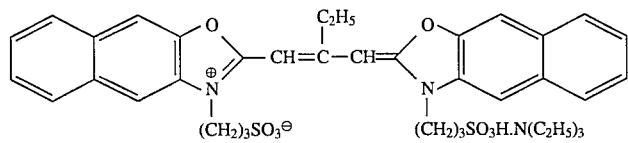 S-6
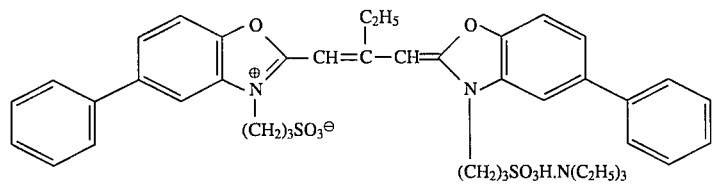 S-7
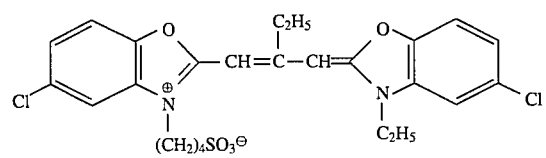 S-8
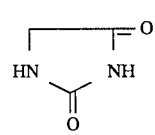 HS-1
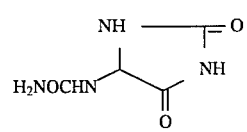 HS-2
$[(CH_2=CHSO_2CH_2)_3CCH_2SO_2(CH_2)_2]_2N(CH_2)_2SO_3K$   H-3
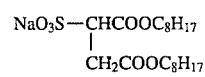 SU-4
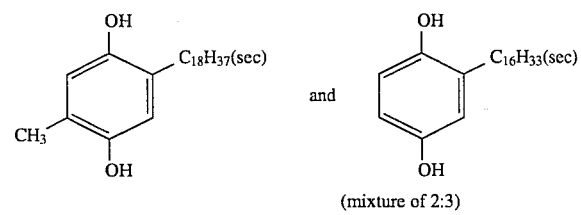 SC-1
(mixture of 2:3)
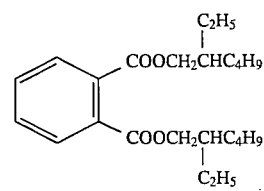 Oil-1
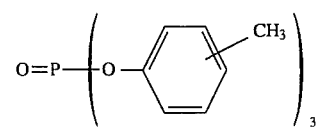 Oil-2
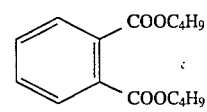 Oil-3

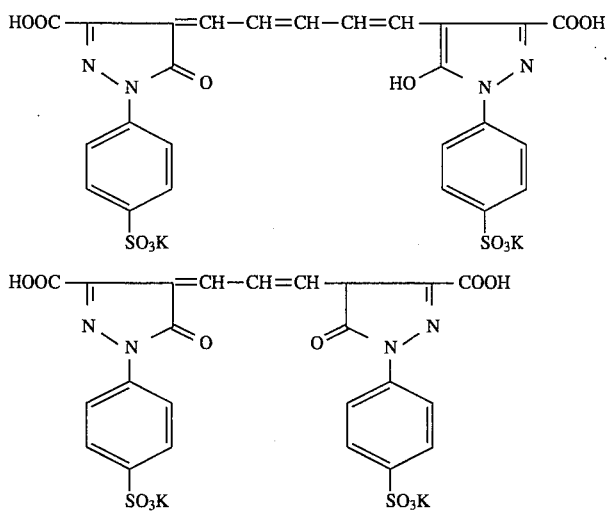

AI-11

AI-12

The resulted color paper was exposed in a usual way and running processing test was made with the following steps

| Step | Temp. | time | Replenishing volume |
|---|---|---|---|
| 1. Color development | 38° C. | 20 s | 80 cc |
| 2. BleachFixing | 38° C. | 20 s | 40 cc |
| 3. Stabilizing* | 30° C. | 20 s (First tank) | |
| | | 20 s (Second tank) | |
| | | 20 s (Third tank) | 120 cc |
| 4. Drying | 60–80° C. | 30 s | |

*Tanks of stabilizing step are arranged as counter current, and the replenisher is provided in the third tank.

Color Developer
Triethanol amine 10 g
Diethylene glycol 5 g
N,N-diethylhydroxylamine 3.0 g
Potassium bromide 20 mg
Potassium chloride 2.2 g
Diethylenetriaminepentaacetic acid 5 g
Potassium sulfite 0.2 g
Tinopal SFP (produced by Ciba-Geigy) 2.0 g
(3-methyl-4-amino-N-ethyl-N-(β-methane-sulfonamido-ethyl)-aniline sulfate 8.0 g
Potassium carbonate 25 g
Potassium hydrogen carbonate 5 g
Water was added to 1 l, and potassium hydroxide or sulfuric acid was added to obtain a pH of 10.10.
Color Developer Replenisher
(Part A)
Triethanol amine 14.0 g
Diethylene glycol 8.0 g
N,N-diethylhydroxylamine 4.0 g
Tinopal SFP (produced by Ciba-Geigy) 2.5 g
Diethylenetriaminepentaacetic acid 1.0 g
Water was added to 30 cc.
(Part B)
Potassium sulfite 0.3 g
(3-methyl-4-amino-N-ethyl-N-(β-methanesulfonamido-ethyl)-aniline sulfate 12.0 g
Water was added to 20 cc.

(Part C)
Potassium carbonate 30 g
Potassium bromide 3 mg
Diethylenetriaminepentaacetic acid 5.0 g
Water was added to 60 cc.
Bleach-Fixer
Ammonium ferric ethylenediaminetetraacetate 53.0 g
Ethylenediaminetetraacetic acid 3.0 g
Sodium thiosulfate 120.0 g
Sodium sulfite 30.0 g
Pottasium bromide 20.0 g
Dilute pottasium hydroxide or dilute nitric acid was added to obtain a pH of 5.40, and water was added to 1.0 l
Bleach-fixer replenisher
(Prt A)
Ammonium ferric ethylenediaminetetraacetate 53.0 g
Ethylenediaminetetraacetic acid 3.0 g
Water was added to 170 cc.
(Part B)
Sodium thiosulfate 120.0 g
Sodium sulfite 30.0 g
Pottasium bromide 20.0 g
Water was added to 300 cc.
Stabilizer
o-phenylphenol 0.1 g
Ammonium sulfite (40% aqueous solution) 5 cc
Tinopal SFP (Made by Ciba-Geigy) 1.0 g
$ZnSO_4$ $7H_2O$ 0.1 g
1-hydroxyethylidene-1,1-diphosphonic acid (60% solution) 3.0 g
Ethylenediaminetetraacetic acid 1.5 g
Aqueous ammonia (25%) 3.0 g
Water was added to 1 l.
Stabilizer Replenisher
(Part A)
o-phenylphenol 0.1 g
Tinopal SFP (Made by Ciba-Geigy) 1.0 g
Pottasium hydroxide was added to adjust pH 12.0, and water was added to 30 cc.
(Part B)
$ZnSO_4$ $7H_2O$ 0.1 g
1-hydroxyethylidene-1,1-diphosphonic acid (60% solution) 3.0 g Ethylenediaminetetraacetic acid 1.5 g
Aqueous ammonia (25 %) 3.0 g
Ammonium sulfite (40% aqueous solution) 5 cc
Water was added to 20 cc.

The resulted color nega film was exposed in the usual manner, and processed in the follownig steps and processing formulae.

Color negative processing

| Step | Time | Temperature | Replenishing volume |
|---|---|---|---|
| Color development | 1 min 30 s | 38° C. | 540 cc |
| Bleaching | 45 s | 38° C. | 155 cc |
| Fixing | 1 min 30 s | 38° C. | 300 cc |
| Stabilization | 90 s | 38° C. | 775 cc |
| Drying | 30 s | 40–70° C. | — |

The replenishing amount is shown per 1 $m_2$ of light sensitive material.

The stabilizing step was conducted with 3 tank ocunter current, and the replenisher was added to the last tank and was overflowed to the previous tank.

Color Developer
Diethylenetriaminepentaacetic acid 1.0 g
Potassium sulfite 4.0 g
Potassium bromide 1.3 g
Hydroxylamine sulfate 2.4 g
4(N-ethyl-N-β-hydroxyethylamino)-2-methyl-aniline sulfate 4.2 g
Potassium iodide 2.3 mg
Potassium carbonate 30.0 g
Water was added to 1 l, and potassium hydroxide or 20% sulfuric acid was added to obtain a pH of 10.01.

Color Developer Replenisher
(Part A)
Diethylenetriaminepentaacetic acid 1.2 g
Potassium sulfite 4.8 g
Sodium bromide 0.4 g
Potassium carbonate 33.0 g
Pottasium hydrogen carbonate 0.2 g
Water was added to make 100 cc.
(Part B)
Hydroxylamine sulfate 3.0 g
Water was added to make 16 cc.
(Part C)
Potassium sulfite 1.0 g
4(N-ethyl-N-β-hydroxyethylamino)-2-methyl-aniline sulfate 6.1 g
Water was added to make 16 cc.

Bleacher
Ammonium ferric 1,3-diaminopropanetetraacetate 138 g
Ammonium ethylenediaminetetraacetate 2.0 g
Ammonium bromide 150 g
Maleic acid 60 g
Succinic acid 40 g
Ammonium nitrate 40 g
Water was added to 1 l, and aqueous ammonia or maleic acid was added to obtain a pH of 4.5.

Bleacher Replenisher
Ammonium ferric 1,3-diaminopropanetetraacetate 0.40 mol
Ammonium ethylenediaminetetraacetate 2.0 g
Ammonium bromide 170 g
Ammonium nitrate 50 g
Maleic acid 86 g
Succinic acid 57 g
Water was added to 1 l, and aqueous ammonia or maleic acid was added to obtain a pH of 3.5.

Fixer
Sodium thiosulfite 50.0 g
Pottasium thiocyanate 194.0 g
Pottasium bisulfite anhydrate 20.0 g
Sodium metabisulfite 4.0 g
Sodium ethylenediaminetetraacetate 1.0 g
Water was added to 1 1l.

Fixer Replenisher
Sodium thiosulfite 50.0 g
Pottasium thiocyanate 194.0 g
Pottasium bisulfite anhydrate 20.0 g
Sodium metabisulfite 4.0 g
Sodium ethylenediaminetetraacetate 1.0 g
Water was added to 500 cc.

Stabilizer
1,2-benzoimidazolin-3-on 0.1 g
Formaldehyde (37% w/w) 1.0 g
Water was added to 1 l.

Stabilizer Replenisher
1,2-benzoimidazolin-3-on 0.1 g
Formaldehyde (37% w/w) 1.0 g
Water was added to 10 cc.

These color negative films and color printing papers were each continuously processed using an automatic processing machine.

All discharged waste liquids, combined together, were concentrated using the reduced pressure evaporative concentrator illustrated in FIG. 1. Also, the same processing was conducted except that formaldehyde in the stabilizer for color negative films was replaced with the compounds listed in Table 22.

Replenishers were prepared using tap water as a solvent in the first cycle alone. After the second cycle, the resulting distillate was used as a solvent. Also, the distillate was supplied to reach the overflow outlet to compensate the water loss due to evaporation every morning.

Continuous processing was continued until the color printing paper color developer replenisher was supplied in an amount 2% of the tank capacity daily and until it became 2 times the volume of tank solution.

A color printing paper, subjected to an ordinary procedure of exposure through an optical wedge, was processed immediately before completion of the running processing sample, and the processed color printing paper was determined for green density of reflected light in the maximum exposure portion.

Also, the first stabilizer tank in the processing of a color negative film and color printing paper, the bleach-fixer tank solution in the processing of a color printing paper, and the fixer tank solution in the processing of a color negative film, were observed for precipitation. Also examined was odor generation upon distillation.

The results are given in Tables 21 and 22.

TABLE 21

| Ingredient in stabilizer | Evaporation temperature (°C.) | Evaporation pressure (mmHg) | Reflective green density Dmax (G) | Precipitation | Odor | Remarks |
| --- | --- | --- | --- | --- | --- | --- |
| Formaldehyde | 100 | 760 | 2.49 | C | Yes | Comparative |
| Formaldehyde | 90 | 700 | 2.06 | D | None | Comparative |
| Formaldehyde | 70 | 240 | 2.00 | D | None | Comparative |
| Formaldehyde | 40 | 55 | 1.98 | D | None | Comparative |
| Formaldehyde | 35 | 45 | 1.85 | D | None | Comparative |
| Formaldehyde | 25 | 25 | 1.83 | D | None | Comparative |
| Formaldehyde | 15 | 15 | 1.76 | D | None | Comparative |
| — | 100 | 760 | 2.00 | B | Yes | Comparative |
| — | 90 | 700 | 2.47 | A | None | Inventive |
| — | 70 | 240 | 2.42 | A | None | Inventive |
| — | 40 | 55 | 2.45 | A | None | Inventive |
| — | 35 | 45 | 2.50 | A | None | Inventive |
| — | 25 | 25 | 2.50 | A | None | Inventive |
| — | 15 | 15 | 2.50 | A | None | Inventive |

TABLE 22

| Ingredient in stabilizer Exemplified compound | Evaporation temperature (°C.) | Evaporation pressure (mmHg) | Reflective green density Dmax (G) | Precipitation | Odor | Remarks |
| --- | --- | --- | --- | --- | --- | --- |
| F-11-1 | 100 | 760 | 2.01 | A | Yes | Comparative |
| F-11-1 | 90 | 700 | 2.43 | A | None | Inventive |
| F-11-1 | 70 | 240 | 2.45 | A | None | Inventive |
| F-11-1 | 40 | 55 | 2.48 | A | None | Inventive |
| F-11-1 | 35 | 45 | 2.51 | A | None | Inventive |
| F-11-1 | 25 | 25 | 2.51 | A | None | Inventive |
| F-11-1 | 15 | 15 | 2.51 | A | None | Inventive |
| F-13-3 | 35 | 45 | 2.51 | A | None | Inventive |
| F-12-1 | 35 | 45 | 2.50 | A | None | Inventive |
| F-10-6 | 35 | 45 | 2.49 | A | None | Inventive |
| F-9-3 | 35 | 45 | 2.49 | A | None | Inventive |
| F-8-1 | 35 | 45 | 2.49 | A | None | Inventive |
| F-7-2 | 35 | 45 | 2.49 | A | None | Inventive |
| F-6-3 | 35 | 45 | 2.49 | A | None | Inventive |
| F-5-8 | 35 | 45 | 2.49 | A | None | Inventive |
| F-4-1 | 35 | 45 | 2.50 | A | None | Inventive |
| F-3-1 | 35 | 45 | 2.50 | A | None | Inventive |
| F-2-1 | 35 | 45 | 2.50 | A | None | Inventive |
| F-1-1 | 35 | 45 | 2.50 | A | None | Inventive |

D: Precipitation occurred in the first stabilizing tank alone after processing of color printing paper.
C: Precipitation occurred in the first stabilizing tank after processing of color printing paper and color negative film.
B: Precipitation occurred in the first stabilizing tank after processing of color printing paper and color negative film and in the color printing paper bleach-fixer tank or color negative film fixer tank.
A: No precipitation.

As seen in Tables 3 and 4 above, the use of a formaldehyde-containing solution results in green density reduction and precipitation when the distillate obtained by evaporative concentration of waste liquid is used as a solvent and as an evaporation compensator. On the other hand, when the compound of the present invention is used in the absence of formaldehyde, the waste liquid can be concentrated under reduced pressure without odor generation, and the resulting distillate can be reused without causing density reduction or precipitation.

The method of the present invention makes it possible to recycle photographic processing waste liquid to eliminate its discharge into the environment. Specifically, the photographic processing waste liquid can be efficiently evaporated and concentrated under reduced pressure without malodorous gas generation, and the resulting distillate can be used as a solvent for processing agents and as an evaporation compensator for processing tanks of an automatic processing machine without affecting color light-sensitive material photographic processing.

Example 26

1) Comparative Process 1

Using automatic processing machines CL-KP50QA for color negative films and CL-PP1501QA for color printing paper, both produced by Konica Corporation, a color negative film Konica Super DD-100, after exposure for actual picture taking, and Konica QA Paper Type A5, after actual printing, were subjected to running processing with Konica Process CNK-4-52 and CPK-2-20 processing agents. All discharged waste liquids, combined together, were concentrated using the reduced pressure evaporative concentrator illustrated in FIG. 1. In the processing with a defoaming agent, FS Antifoam 90, produced by Dow Corning K. K., was supplied by bellows pump 11 set to supply 1 g of the defoaming agent per liter of waste liquid.

The system was operated at a distilling temperature of 45° C. under a distilling pressure of 50 mmHg while supplying the waste liquid to the evaporative concentrator at a feed rate of 2.0 l/hr.

Running processing was continued until a total of 100 l of waste liquid was accumulated and until not less than 80 l of distillate was obtained.

The first processing solution was prepared with tap water. After the second cycle, the color developer replenisher was prepared with the distillate described above. A total of 5 cycles were tested.

Each cycle lasted 5 days. In the first cycle, tap water was used to compensate the evaporation loss in the color developer tank of the automatic processing machine every morning. After the second cycle, the same distillate as used to prepare the color developer replenisher was used. The color printing paper used was QA Paper Type A5 (containing not lower than 99 mol % silver chloride), produced by Konica Corporation. The color developer and color developer replenisher for the color printing paper had the compositions shown below.

The processing agents used, except the color developing agent, were those for CNK-4-52 for color negative films and those for CPK-2-20 for color printing paper. The processing conditions were the standard ones for Konica Color Negative Film Process CNK-4-52 and Konica Color Printing Paper Process CPK-2-20, respectively.

Color Developer for Color Printing Paper
Diethylene glycol 15.0 g
Hydrazinodiacetic acid 5.0 g
Potassium bromide 20 mg
Potassium chloride 3.5 g
Diethylenetriaminepentaacetic acid 5.0 g
Potassium sulfite
Color developing agent (3-methyl-4-amino-N-ethyl-N-(β-methanesulfonamidoethyl)-aniline sulfate 5.5 g
Potassium carbonate 25.0 g
Potassium hydrogen carbonate 5.0 g
Tinopal SFP (produced by Ciba-Geigy) 1.2 g
Ubitex MST (produced by Ciba-Geigy) 1.5 g
Water was added to 1 l, and potassium hydroxide or sulfuric acid was added to obtain a pH of 10.00.

Color Developer Replenisher for Color Printing Paper
Diethylene glycol 15.0 g
Tinopal SFP (produced by Ciba-Geigy) 1.2 g
Ubitex MST (produced by Ciba-Geigy) 1.5 g
Hydrazinodiacetic acid 7.0 g
Potassium chloride 0.3 g
Diethylenetriaminepentaacetic acid 7.5 g
Potassium sulfite $7.0 \times 10^{-4}$ mol
Color developing agent (3-methyl-4-amino-N-ethyl-N-(β-methanesulfonamidoethyl)-aniline sulfate 7.0 g
Potassium carbonate 0.0 g
Potassium hydroxide 1.0 g
Water was added to 1 l, and potassium hydroxide or sulfuric acid was added to obtain a pH of 10.60.

The replenishing rate for the color developer tank of the automatic processing machine for color printing paper was 160 cc per $m^2$ of color printing paper processed.

(2) Inventive Process 1

The same processing procedure as in Comparative Process 1 was followed except that the color developer and color developer replenisher for color printing paper had the compositions shown below. After the second cycle, the distillate was used as a solvent for the replenisher and as an evaporation compensator for the automatic processing machine. A total of 5 cycles were tested. The replenishing rate for the color developer tank of the automatic processing machine for color printing paper was 160 cc per $m^2$ of color printing paper processed.

Color Developer
Diethylene glycol 15.0 g
Example Compound A-13 5.0 g
Potassium bromide 20.0 mg
Potassium chloride 3.5 g
Diethylenetriaminepentaacetic acid 5.0 g
Potassium sulfite 0.2 g
Color developing agent (3-methyl-4-amino-N-ethyl-N-(β-methanesulfonamidoethyl)-aniline sulfate 5.5 g
Potassium carbonate 25.0 g
Tinopal SFP (produced by Ciba-Geigy) 1.2 g
Ubitex MST (produced by Ciba-Geigy) 1.5 g
Water was added to 1 l, and potassium hydroxide or sulfuric acid was added to obtain a pH of 10.10.

Color Developer Replenisher
Diethylene glycol 15.0 g
Tinopal SFP (produced by Ciba-Geigy) 1.2 g
Ubitex MST (produced by Ciba-Geigy) 1.5 g
Example Compound A-13 7.5 g
Potassium chloride 0.3 g
Diethylenetriaminepentaacetic acid 7.5 g
Potassium sulfite $7.0 \times 10^{-4}$ mol
Color developing agent (3-methyl-4-amino-N-ethyl-N-(β-methanesulfonamidoethyl)-aniline sulfate 7.0 g
Potassium carbonate 30.0 g
Potassium hydroxide 1.0 g
Water was added to 1 l, and potassium hydroxide or sulfuric acid was added to obtain a pH of 10.60.

(3) Inventive Process 2

The same processing procedure as in Inventive Process 1 was followed except that Example Compound A-13 of color developer was replaced with Example Compound A-15.

(4) Inventive Process 3

The same processing procedure as in Inventive Process 1 was followed except that Example Compound A-13 for color developer was replaced with Example Compound A-34.

(5) Inventive Process 4

The same processing procedure as in Inventive Process 1 was followed except that Example Compound A-13 was replaced with Example Compound A-28.

(6) Inventive Process 5

The same processing procedure as in Inventive Process 1 was followed except that Example Compound A-13 was replaced with Example Compound A-29.

(7) Inventive Process 6

The same processing procedure as in Inventive Process 1 was followed except that Example Compound A-13 was replaced with Example Compound B-7.

(8) Inventive Process 7

The same processing procedure as in Inventive Process 1 was followed except that Example Compound A-13 was replaced with Example Compound B-47.

At the top, first, third and fifth of the above eight running tests, Konica Color Paper Control Strip CPK-2 was processed using an automatic processing machine for color printing paper, and assessed for photographic performance.

In the fifth running test, filter clogging and the circulatory volume of the color developer tank were examined.

Table 23 shows the results for minimum density against a red filter, i.e., the degree of cyan staining, and filter clogging.

The evaluation criteria for the degree of filter clogging are as follows:

A: Almost no foreign matter, with no reduction in circulatory volume.

B: A little foreign matter, with about ¼ reduction in circulatory volume.

C: Foreign matter present, with a ½ or more reduction in circulatory volume.

Ubitex MST (produced by Ciba-Geigy) 1.5 g

Water was added to 1 l, and potassium hydroxide or sulfuric acid was added to obtain a pH of 10.10.

Color Developer Replenisher for Color Printing Paper

Diethylene glycol 15.0 g

Tinopal SFP (produced by Ciba-Geigy) 1.2 g

Ubitex MST (produced by Ciba-Geigy) 1.5 g

Hydrazinodiacetic acid 8.0 g

Diethylenetriaminepentaacetic acid 7.5 g

Potassium sulfite $7.0 \times 10^{-4}$ mol

Color developing agent (3-methyl-4-amino-N-ethyl-N-(β-methanesulfonamidoethyl)-aniline sulfate 9.5 g Potassium carbonate 30.0 g Potassium hydroxide 1.0 g

TABLE 23

| Process | Additive to color* developer | Density through red filter (cyan stain) | | | | Filter clogging |
|---|---|---|---|---|---|---|
| | | TOP | one cycle | 3 cycles | 5 cycles | |
| Comparative-1 | Hydrozinodiacetic acid | 0.02 | 0.03 | 0.04 | 0.06 | B–C |
| Inventive-1 | Exemplified A-13 | 0.02 | 0.03 | 0.03 | 0.03 | A |
| Inventive-2 | Exemplified A-15 | 0.02 | 0.03 | 0.03 | 0.03 | A |
| Inventive-3 | Exemplified A-34 | 0.02 | 0.02 | 0.03 | 0.03 | A |
| Inventive-4 | Exemplified A-28 | 0.02 | 0.02 | 0.03 | 0.03 | A |
| Inventive-5 | Exemplified A-29 | 0.02 | 0.02 | 0.03 | 0.03 | A |
| Inventive-6 | Exemplified B-7 | 0.02 | 0.02 | 0.03 | 0.03 | A |
| Inventive-7 | Exemplified B-47 | 0.02 | 0.02 | 0.03 | 0.03 | A |

*Including replenisher thereof

As seen in Table 23, in the comparative process, the red filter density (cyan staining) tends to increase as distillate recycling is repeated. Filter clogging was also noted in the automatic processing machine color developer tank. On the other hand, in Inventive Processes 1 through 7, the red filter density was almost constant among the first through fifth running tests, with no filter clogging.

Example 27

(9) Comparative Process 2

The same procedure as in Comparative Process 1 was followed except that the color developer and color developer replenisher for color printing paper had the compositions shown below, and processing was conducted at two color developer replenishing rates, i.e., 120 cc and 70 cc per m² of color printing paper processed. After the second cycle, the distillate was used to prepare the color developer replenisher and as an evaporation compensator for the automatic processing machine. A total of 5 cycles were tested.

Color Developer for Color Printing Paper

Diethylene glycol 15.0 g

Hydrazinodiacetic acid 5.0 g

Potassium bromide 20.0 mg

Potassium chloride 7.0 g

Diethylenetriaminepentaacetic acid 5.0 g

Potassium sulfite 0.2 g

Color developing agent (3-methyl-4-amino-N-ethyl-N-(β-methanesulfonamidoethyl)-aniline sulfate 5.5 g Potassium carbonate 25.0 g Potassium hydrogen carbonate 5.0 g Tinopal SFP (produced by Ciba-Geigy) 1.2 g Water was added to 1 l, and potassium hydroxide or sulfuric acid was added to obtain a pH of 10.60.

(10) Inventive Process 8

The same processing procedure as in Comparative Process 2 was followed except that the color developer and color developer replenisher for color printing paper had the following compositions.

Color Developer for Color Printing Paper

Diethylene glycol 15.0 g

N,N-diethylhydroxylamine 3.6 g

Example Compound A-15 7.0 g

Potassium bromide 20.0 mg

Potassium chloride 7.0 g

Diethylenetriaminepentaacetic acid 5.0 g

Potassium sulfite 0.2 g

Color developing agent (3-methyl-4-amino-N-ethyl-N-(β-methanesulfonamidoethyl)-aniline sulfate 5.5 g Potassium carbonate 25.0 g Tinopal SFP (produced by Ciba-Geigy) 1.2 g Ubitex MST (produced by Ciba-Geigy) 1.5 g Water was added to 1 l, and potassium hydroxide or sulfuric acid was added to obtain a pH of 10.10.

Color Developer Replenisher

Diethylene glycol 15.0 g

Tinopal SFP (produced by Ciba-Geigy) 1.2 g

Ubitex MST (produced by Ciba-Geigy) 1.5 g

N,N-diethylhydroxylamine 5.0 g

Example Compound A-15 7.5 g

Diethylenetriaminepentaacetic acid 7.5 g

Potassium sulfite $7.0 \times 10^{-4}$ mol

Color developing agent (3-methyl-4-amino-N-ethyl-N-(β-methanesulfonamidoethyl)-aniline sulfate 9.5 g Potassium carbonate 30.0 g Potassium hydroxide 1.0 g Water was added to 1 l, and potassium hydroxide or sulfuric acid was added to obtain a pH of 10.60.

(11) Inventive Process 9

The same processing procedure as in Inventive Process 8 was followed except that Example Compound A-15 for the color developer and color developer replenishers was replaced with Example Compound A-34.

(12) Inventive Process 10

The same processing procedure as, in Inventive Process 8 was followed except that Example Compound A-15 was replaced with Example Compound A-28.

(13) Inventive Process 11

The same processing procedure as in Inventive Process 8 was followed except that Example Compound A-15 was replaced with Example Compound B-7.

At the top, first, third and fifth of the above ten running tests, Konica Color Paper Control Strip CPK-2 was processed using an automatic processing machine for color printing paper and assessed for photographic performance.

In the fifth running test, filter clogging and circulatory volume of the color developer tank were examined.

Table 24 shows the results for minimum density against a red filter and filter clogging.

The evaluation criteria for the degree of filter clogging are the same as used in Example 26. As the number of C marks increases, the amount of foreign matter increases.

The method of the present invention makes it possible to recycle photographic processing waste liquid to eliminate its discharge into the environment. Specifically, the photographic processing waste liquid could be efficiently evaporated and concentrated under reduced pressure without malodorous gas generation, and the resulting distillate could be repeatedly used as a solvent for processing agents and as an evaporation compensator for processing tanks of an automatic processing machine without affecting the photographic processing of the silver halide photographic light-sensitive material. Also, the replenishing rate could be lowered, and the running processing cost could be reduced.

We claim:

1. A recycling method for photographic processing waste liquid wherein the processing waste liquid is subjected to evaporative concentration under a reduced pressure of not higher than 700 mmHg and at a temperature of not higher than 90° C., and the resulting distillate is used as a solvent for photographic processing agents or as an evaporation compensator for processing tanks of an automatic processing machine, and wherein the photographic processing waste liquid contains an aliphatic monobasic acid, an amino acid monobasic acid, an aromatic monobasic acid, an aliphatic dibasic acid, an amino acid dibasic acid or an aromatic dibasic acid, but substantially no acetic acid.

2. The recycling method for photographic processing wasteliquid of claim 1, wherein said photographic processing waste liquid has an ammonium ion concentration of not higher than 2000 ppm and is subjected to evaporation under a reduced pressure of not higher than 200 mmHg and at a temperature of not higher than 60° C.

TABLE 24

| Process | Additive to* color developer | Replenishing amount (cc/m$^2$) | Density through red filter (cyan stain) | | | | Filter clogging |
|---|---|---|---|---|---|---|---|
| | | | TOP | one cycle | 3 cycles | 5 cycles | |
| Comparative-2 | Hydrozino-diacetic acid | 120 | 0.02 | 0.03 | 0.05 | 0.06 | B |
| | | 70 | 0.02 | 0.04 | 0.06 | 0.09 | C |
| Inventive-8 | Exemplified A-15 | 120 | 0.02 | 0.03 | 0.03 | 0.03 | A |
| | | 70 | 0.02 | 0.03 | 0.03 | 0.03 | A |
| Inventive-9 | Exemplified A-34 | 120 | 0.02 | 0.03 | 0.03 | 0.03 | A |
| | | 70 | 0.02 | 0.03 | 0.03 | 0.03 | A |
| Inventive-10 | Exemplified A-28 | 120 | 0.02 | 0.02 | 0.03 | 0.03 | A |
| | | 70 | 0.02 | 0.02 | 0.03 | 0.04 | A |
| Inventive-11 | Exemplified B-7 | 120 | 0.02 | 0.02 | 0.03 | 0.03 | A |
| | | 70 | 0.02 | 0.02 | 0.03 | 0.04 | A |

*Including replenisher thereof

As seen in Table 24, in the comparative process, red filter density tended to rise as recycling of the distillate is repeated, and the density further rises the replenishing rate is decreased. On the other hand, in Inventive Processes 8 through 11, red filter density was almost constant, and no cyan staining occurs.

As for filter clogging, it was so severe that operation of the automatic processing machine was difficult in the comparative process, while it posed no problem in any of Inventive Processes 8 through 11.

Example 28

Samples were conducted in the same manner as in Examples 26 and 27 except that the heat source for the reduced pressure evaporative concentrator was changed from a heat pump to a Peltier element.

Exactly the same results as in Examples 26 and 27 were obtained.

3. The recycling method for photographic processing waste liquid of claim 1, wherein said photographic processing waste liquid is subjected to evaporation in the presence of a silicone defoaming agent.

4. The recycling method for photographic processing waste liquid of claim 1, wherein an acid other than acetic acid is contained in the photographic processing waste liquid in a photographic processing waste liquid tank, evaporative concentration chamber or a distillate tank.

5. The recycling method for photographic processing waste liquid of claim 1, wherein the waste liquid contains substantially no benzyl alcohol.

6. A recycling method for photographic processing waste liquid of claim 1, wherein the photographic processing waste liquid is a mixture of photographic processing waste liquids from two or more automatic processing machines.

7. A recycling method for photographic processing waste liquid of claim 1, wherein the resulting distillate is used as a solvent for a developer and the developer contains at least one kind of the compound represented by the following formula I or at least one monosaccharide;

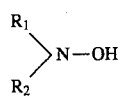

Formula I wherein $R_1$ and $R_2$ independently represent an alkyl group which may be substituted, an aryl group, an $R_3CO$ group or a hydrogen atom, ($R_1$ and $R_2$ do not represent a hydrogen atom at the same time); $R_3$ represents an alkyl group, an alkoxy group or an aryl group.

8. A recycling method for photographic processing waste liquid of claim 7, wherein the developer is used for the development of a silver halide photographic light-sensitive material having a silver chloride content of not lower than 80 mol %, and the replenishing rate for the color developer is not higher than 120 cc per m² of the silver halide photographic light-sensitive material.

9. The recycling method of claim 1 wherein the resulting distillate is used as a solvent for a developer and the developer contains at least one of the compounds sdlected from the group consisting of

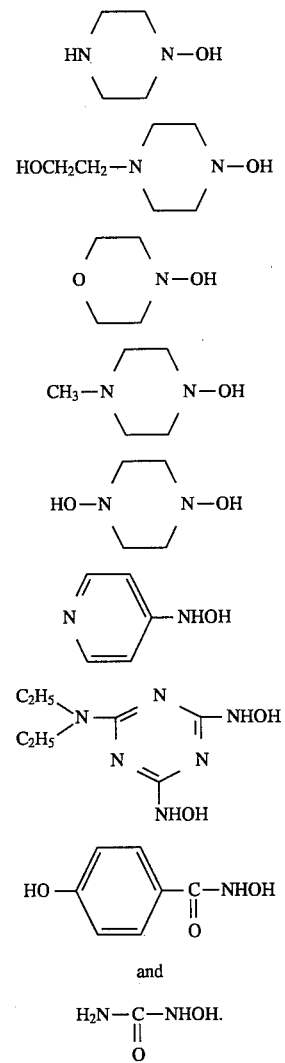

A-32

A-33

A-34

A-35

A-36

A-37

A-39

A-42 and

A-43

10. A recycling method for photographic processing waste liquid of claim 1, wherein the resulting distillate contains carbonate or bicarbonate of not higher than 5 g/l.

11. A recycling method for photographic processing waste liquid of claim 1, wherein the photographic processing waste liquid has an ammonium ion concentration of not higher than 2000 ppm.

12. A recycling method for photographic processing waste liquid of claim 1, wherein the photographic processing waste liquid contains a stabilizer waste, the stabilizer waste containing substantially no formaldehyde.

13. The recycling method for photographic processing waste liquid of claim 1 wherein the photographic processing waste liquid contains the aliphatic dibasic acid, the amino acid dibasic acid or the aromatic dibasic acid.

14. A recycling method for photographic processing waste liquid of claim 12, wherein the stabilizer waste contains at least one of the compounds represented by formula F-1 through F-13;

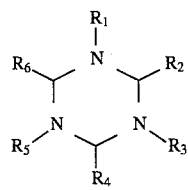

Formula F-1 wherein each of $R_1$ to $R_6$ is a hydrogen atom or a monovalent organic group;

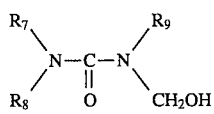

Formula F-2

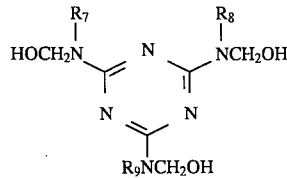

Formula F-3

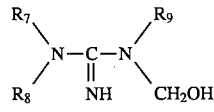

Formula F-4 wherein each of $R_7$ to $R_9$ is a hydrogen atom or a methylol group;

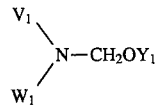

Formula F-5

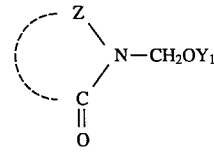

Formula F-6 wherein $V_1$ and $W_1$ each represents an electron attracting group or $V_1$ and $W_1$ may form a 5 or 6 membered nitrogen containing heterocycle by bonding $V_1$ and $W_1$, $Y_1$ is a hydrogen atom or a group which releases upon hydrolysis, Z represents a non-metal atomic group necessary to form a single- or condensed- nitrogen-containing heterocycle with a nitrogen atom and C=O group;

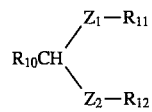

Formula F-7 wherein $R_{10}$ is a hydrogen atom or an aliphatic group, $R_{11}$ and $R_{12}$ each represent an aliphatic or aryl group, and $R_{11}$ and $R_{12}$ may form a cycle by bonding to each other, $Z_1$ and $Z_2$ each represent oxygen, sulfur or —$N(R_{13})$—, with the proviso that $Z_1$ and $Z_2$ are not —$N(R_{13})$— at the same time, $R_{13}$ is a hydrogen atom, a hydroxy, aliphatic or aryl group;

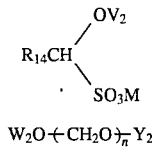  Formula F-8

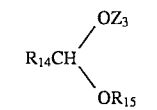  Formula F-9

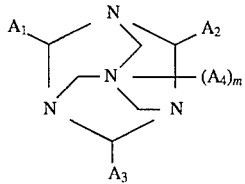  Formula F-10 wherein $R_{14}$ represents a hydrogen atom or an aliphatic group, $V_2$ is a group which releases upon hydrolysis, M is a cation, $W_2$ and $Y_2$ is each a hydrogen atom or a group which releases upon hydrolysis, n is an integer of 1 to 10, $Z_3$ represents a hydrogen atom, an aliphatic or aryl group or a group which releases upon hydrolysis, $R_{15}$ is an aliphatic or aryl group, $Z_3$ may form a cycle by bonding to $R_{15}$;

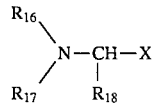  Formula F-11 wherein $A_1$ to $A_4$ each represents a hydrogen atom, an alkyl, aryl, or pyridyl group, m is 0 or 1, and when m is 1, there is a chloride counter-ion;

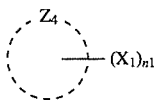  Formula F-12 wherein $R_{16}$, $R_{17}$ and $R_{18}$ each represents a hydrogen atom, alkyl or aryl group, X is a nitrogen containing heterocycle;

Formula F-13 wherein $Z_4$ is a hydroxy-substituted or nonsubstituted carbon atom cycle or a non-metallic atom group to form a hydroxy-substituted or nonsubstituted heterocycle, $X_1$ is an aldehyde, —$CH(OR)_{19})$ $(OR_{20})$ or —$CH(OH)$ $(OR_{19})$, $R_{19}$ and $R_{20}$ each is a $C_1$–$C_4$ alkyl group, and $n_1$ is an integer of 1 to 4.

15. The recycling method of claim 1 wherein the amount of acetic acid is not higher than 1 ml per liter of waste liquid.

16. The recycling method of claim 1 wherein the amount of acetic acid is not higher than 0.5 ml per liter of waste liquid.

17. The recycling method of claim 7 wherein $R_1$ and $R_2$ are independently selected from the group consisting of H, $CH_3$, $C_2H_5$, $C_3H_7$, $C_2H_4OH$, $C_2H_4OCH_3$, $C_2H_4OC_2H_5$, $C_3H_6OCH_3$, $C_3H_6OC_3H_7$, $C_2H_4SO_3H$, $C_2H_4COOH$ and $C_2H_4PO_3H_2$.

18. The recycling method of claim 7 wherein the compound of formula I is selected from the group consisting of

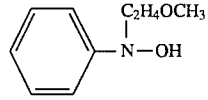  A-38

$CH_3CO—NHOH$   A-40 and

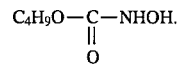  A-41

* * * * *